United States Patent
Xalter et al.

(10) Patent No.: US 8,729,163 B2
(45) Date of Patent: May 20, 2014

(54) PHOSPHINIC ACID HYDRAZIDE FLAME RETARDANT COMPOSITIONS

(75) Inventors: Rainer Xalter, Basel (CH); Simon Kniesel, Heidelberg-Dossenheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/810,671

(22) PCT Filed: Jul. 26, 2011

(86) PCT No.: PCT/EP2011/062791
§ 371 (c)(1),
(2), (4) Date: Feb. 13, 2013

(87) PCT Pub. No.: WO2012/013652
PCT Pub. Date: Feb. 2, 2012

(65) Prior Publication Data
US 2013/0137800 A1 May 30, 2013

Related U.S. Application Data

(60) Provisional application No. 61/368,272, filed on Jul. 28, 2010.

(30) Foreign Application Priority Data

Jul. 28, 2010 (EP) .................................... 10171043

(51) Int. Cl.
C08K 5/5399 (2006.01)

(52) U.S. Cl.
CPC .................... C08K 5/5399 (2013.01)
USPC ........... 524/100; 524/136; 524/115; 524/121; 524/99; 524/236

(58) Field of Classification Search
CPC .................................................... C08K 5/5399
USPC ........... 524/100, 136, 121, 99, 236, 115, 464
See application file for complete search history.

(56) References Cited

U.S. PATENT DOCUMENTS

| | | | |
|---|---|---|---|
| 3,058,926 A | 10/1962 | Eichhorn | |
| 3,134,742 A | 5/1964 | Wismer et al. | |
| 3,269,962 A | 8/1966 | Eichhorn | |
| 3,271,333 A | 9/1966 | Eichhorn | |
| 3,284,544 A | 11/1966 | Eichhorn | |
| 3,341,625 A | 9/1967 | Gillham et al. | |
| 3,420,786 A | 1/1969 | Weber et al. | |
| 3,897,373 A | 7/1975 | Bachl et al. | |
| 4,237,179 A | 12/1980 | Mentzel et al. | |
| 4,308,197 A * | 12/1981 | Byrd et al. | 442/142 |
| 4,403,075 A * | 9/1983 | Byrd et al. | 525/418 |
| 4,486,347 A | 12/1984 | Gorbacheva et al. | |
| 5,084,546 A | 1/1992 | Fischer et al. | |
| 6,204,313 B1 | 3/2001 | Bastiaens et al. | |
| 2003/0207969 A1 * | 11/2003 | Capocci et al. | 524/236 |

FOREIGN PATENT DOCUMENTS

| | | |
|---|---|---|
| FR | 1425563 A | 1/1963 |
| WO | 99/00450 A1 | 1/1999 |
| WO | 00/02869 A1 | 1/2000 |
| WO | 2008/119693 A1 | 10/2008 |

OTHER PUBLICATIONS

Steininger E., Monatshefte Fur Chemie, vol. 97, No. 2, 1966, pp. 383-390.

* cited by examiner

*Primary Examiner* — Michael M Bernshteyn
(74) *Attorney, Agent, or Firm* — Tyler A. Stevenson

(57) ABSTRACT

The invention relates to flame retardant compositions, wherein a phosphinic acid hydrazide is present in a polymer substrate. The combination with >NOR-compounds improves the flame retardant properties.

15 Claims, No Drawings

PHOSPHINIC ACID HYDRAZIDE FLAME RETARDANT COMPOSITIONS

The invention relates to flame retardant compositions that comprise phosphinic acid hydrazide compounds and a polymer substrate.

Flame retardant(s) (FR, FRs) are added to polymeric materials (synthetic or natural) to enhance the flame retardant properties of the polymers. Depending on their composition, flame retardants may act in the solid, liquid or gas phase either chemically, e.g. as a spumescent by liberation of nitrogen, and/or physically, e.g. by producing a foam coverage. Flame retardants interfere during a particular stage of the combustion process, e.g. during heating, decomposition, ignition or flame spread.

There is still a need for flame retardant compositions with improved properties that can be used in different polymer substrates.

Inorganic and organic compounds with FR-activity have been used for achieving the FR-effect in various types of polymers. Such compounds include halogenated hydrocarbons, phosphorous containing compounds, metal containing compounds, such as metal oxides and hydroxides, and melamine derivatives. Halogenated FRs are very commonly used due to their effectiveness. Nevertheless, the use of halogenated compounds has generally become of an environmental concern.

To diminish the problems associated with halogenated FRs, synergists are often used in combination with halogenated FRs. Synergists are compounds which enhance the flame retarding properties of the halogenated FRs and thus enable the use of halogenated FRs in substantially reduced amounts. Synergistic compounds encompass a group of compounds known as "free radical initiators", which include organic peroxides (see e.g. U.S. Pat. No. 3,058,926), dibenzyl compounds (see e.g. U.S. Pat. Nos. 3,271,333 and 3,420,786), disulphides (see e.g. U.S. Pat. No. 3,284,544), hydrazones (see e.g. U.S. Pat. No. 3,269,962), and azo-compounds (see e.g. U.S. Pat. Nos. 4,237,179, 3,897,373, 4,486,347 and FR 1 425 563). Such synergists are used only in combination with other FRs, and typically with said halogenated FRs. The azo-compounds have been used e.g. as azo dyes with an additional function as FR-synergists, and are typically in complex form with transition metal ions, e.g. Cu or Cr.

Non-halogenated N-hydrocarbyloxy hindered amino light stabilizers (NOR-HALS) have also been proposed for solving the problem. These can be used alone, e.g. in place of halogenated FRs, or as synergists for FR-applications (see e.g. WO 99/00450).

Increased standards with regard to safety and environmental requirements result in stricter regulations. Particularly known halogen containing flame retardants no longer match all necessary requirements. Therefore, halogen free flame retardants are preferred, particularly in view of their better performance in terms of smoke density associated with fire. Improved thermal stability and decreased delamination tendency are further benefits of halogen free flame retardant compositions.

WO 00/02869 discloses polyphosphate salts of a 1,3,5-triazine compound and its use for flame retardant compositions.

U.S. Pat. No. 5,084,546 discloses flame retardant epoxy resin compositions, wherein hydroxyalkyl phosphine oxides are present as active components.

Published PCT/EP 2008/053474 discloses flame retardant epoxy resin compositions, wherein 6H-dibenz[c,e][1,2]oxaphosphorin-6-oxide is present as an active component.

It has surprisingly been found that polymers with excellent flame retardant properties are prepared in the event that phosphinic acid hydrazide compounds are added to a polymer base. Phosphinic acid hydrazide compounds have excellent FR-properties, either if applied alone, or combined with other compounds having FR-properties.

Therefore, the invention relates to a composition, particularly a flame retardant composition, which comprises a) A compound of the formula

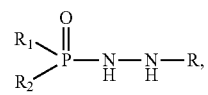

(I)

Wherein

One of $R_1$ and $R_2$ represents hydrogen or a substituent selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono- or bicyclic $C_5$-$C_{20}$cycloalkyl, mono- or bicyclic $C_1$-$C_{12}$alkyl-$C_5$-$C_{20}$cycloalkyl, and mono- or bicyclic $C_5$-$C_{20}$cycloalkyl-$C_1$-$C_4$alkyl; or Both $R_1$ and $R_2$ independently of one another represent substituents selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono- or bicyclic $C_5$-$C_{20}$cycloalkyl, mono- or bicyclic $C_1$-$C_{12}$alkyl-$C_5$-$C_{20}$cycloalkyl, and mono- or bicyclic $C_5$-$C_{20}$cycloalkyl-$C_1$-$C_4$alkyl; or $R_1$ and $R_2$ together represent $C_2$-$C_5$alkylene; and R represents hydrogen or a group of the partial formula

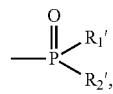

(A)

Wherein $R_1'$ and $R_2'$ are defined as $R_1$ and $R_2$, and salts of these compounds; and b) A polymer substrate.

A preferred embodiment of the invention relates to a composition, which comprises as Component a) a compound of the formula

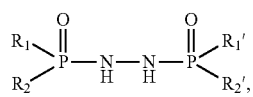

(Ia)

Wherein $R_1$ and $R_2$ independently of one another represent substituents selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono- or bicyclic $C_5$-$C_{20}$cycloalkyl, mono- or bicyclic $C_1$-$C_{12}$alkyl-$C_5$-$C_{20}$cycloalkyl, and mono- or bicyclic $C_5$-$C_{20}$cycloalkyl-$C_1$-$C_4$alkyl;

And $R_1'$ and $R_2'$ are defined as $R_1$ and $R_2$.

Another preferred embodiment of the invention relates to a composition, which comprises as Component a) a compound of the formula

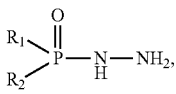

Wherein $R_1$ and $R_2$ independently of one another represent substituents selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono- or bicyclic $C_5$-$C_{20}$cycloalkyl, mono- or bicyclic $C_1$-$C_{12}$alkyl-$C_5$-$C_{20}$cycloalkyl, and mono- or bicyclic $C_5$-$C_{20}$cycloalkyl-$C_1$-$C_4$alkyl.

A particularly preferred embodiment of the invention relates to composition, which comprises as Component a) a compound (I), wherein Both $R_1$ and $R_2$ independently of one another represent substituents selected from the group consisting of $C_1$-$C_{20}$alkyl, $C_6$-$C_{20}$aryl, $C_1$-$C_{12}$alkyl-$C_6$-$C_{20}$aryl and $C_6$-$C_{20}$aryl-$C_1$-$C_4$alkyl; and R represents hydrogen or a group of the partial formula (A), Wherein $R_1'$ and $R_2'$ are defined as $R_1$ and $R_2$, and salts of these compounds.

A highly preferred embodiment of the invention relates to a composition, which comprises as Component a) a compound (I), wherein Both $R_1$ and $R_2$ independently of one another represent substituents selected from the group consisting of $C_1$-$C_8$alkyl and phenyl; and R represents hydrogen or a group of the partial formula (A), Wherein $R_1'$ and $R_2'$ are defined as $R_1$ and $R_2$, and salts of these compounds.

A most preferred embodiment of the invention relates to a composition, which comprises a) A compound (I), wherein Both $R_1$ and $R_2$ independently of one another represent substituents selected from the group consisting of $C_1$-$C_8$alkyl and phenyl; and R represents hydrogen or a group of the partial formula (A), wherein $R_1'$ and $R_2'$ are defined as $R_1$ and $R_2$, and salts of these compounds; and b) A thermoplastic polymer substrate.

The compositions defined above for use as flame retardants are another embodiment of the invention.

The compounds (I) are characterized by their excellent flame retardancy. The instant compositions have excellent initial colour and show little yellowing.

The compounds (I) may be used in combination with halogenated and/or non-halogenated FR-compounds, for example non-halogenated FR, to improve flame retarding efficacy. Such halogenated and/or non-halogenated FR-compounds may be conventional organic or inorganic halogenated FR-compounds or phosphorous, antimony or metal hydroxide FR-compounds. The instant compounds may have a synergistic effect on other conventional FR-compounds. In that event, the compounds (I) allow a significant reduction of the amounts needed when applying conventional FR-compounds, such as halogenated or antimony FR-compounds.

The general terms used in the description of the instant invention, unless defined otherwise, are defined as follows:

Component a)

In a compound (I), $R_1$ and $R_2$ defined as $C_1$-$C_{20}$alkyl are, e.g. methyl, ethyl or straight chain or branched $C_3$-$C_{30}$alkyl, e.g. n-propyl, isopropyl, n-, iso- or tert-butyl, n-pentyl, isoamyl, neopentyl, 2-ethylbutyl, n-hexyl, 1-methylpentyl, 1,3-dimethylbutyl, n-heptyl, isoheptyl, n-octyl, 1,4,4-trimethyl-2-pentyl, 3,4-, 3,5- or 4,5-dimethyl-1-hexyl, 3- or 5-methyl-1-heptyl, 1,1,3,3-tetramethylbutyl, 2-ethylhexyl, branched octyl as obtained from a dimer of isobutylene, n-nonyl, 1,1,3-trimethylhexyl, branched nonyl as obtained from a trimer of tripropylene, 1-methylundecyl, 2-n-butyl-n-octyl, branched dodecyl obtained from a trimer of isobutylene or a tetramer of propylene, branched pentadecyl obtained from a pentamer of propylene, 2-n-hexyl-n-decyl or 2-n-octyl-n-dodecyl.

Hydroxy-$C_2$-$C_8$alkyl is preferably hydroxy-$C_2$-$C_5$alkyl, for example 2-hydroxyethyl, 2- or 3-n-hydroxypropyl or 2-hydroxy-isobutyl (=2-methyl-2-hydroxypropyl).

$C_2$-$C_{20}$Alkenyl is, for example, 1-propenyl, allyl, methallyl, 2-butenyl or 2-pentenyl.

$C_6$-$C_{20}$Aryl is, for example, phenyl or 1- or 2-naphthyl.

$C_1$-$C_{12}$Alkyl-$C_6$-$C_{20}$aryl is $C_6$-$C_{20}$aryl, preferably phenyl that is substituted, for example, by from one to three of the $C_1$-$C_4$alkyl radicals described above or by one or two $C_1$-$C_6$alkyl radicals or one $C_1$-$C_{12}$alkyl radical.

$C_6$-$C_{20}$Aryl-$C_1$-$C_4$alkyl is preferably phenyl-$C_1$-$C_4$alkyl, e.g. benzyl or 1-phenyl-1-ethyl or 2-phenyl-1-ethyl.

Mono- or bicyclic $C_5$-$C_{20}$cycloalkyl is preferably $C_5$-$C_{12}$cycloalkyl, e.g. cyclopentyl or cyclohexyl.

Mono- or bicyclic $C_1$-$C_{12}$alkyl-$C_5$-$C_{20}$cycloalkyl is preferably $C_5$-$C_{12}$cycloalkyl, e.g. cyclopentyl or cyclohexyl, substituted by, for example, one to three of the $C_1$-$C_4$alkyl radicals, e.g. methyl or tert-butyl, described above or by one or two $C_1$-$C_6$alkyl radicals or one $C_1$-$C_{12}$alkyl radical.

Mono- or bicyclic $C_5$-$C_{20}$cycloalkyl-$C_1$-$C_4$alkyl, is preferably $C_5$-$C_{12}$cycloalkyl-$C_1$-$C_4$alkyl, e.g. cyclopentylmethyl or cyclohexylmethyl.

In a compound (I), $R_1$ and $R_2$ are different. In that embodiment, one of $R_1$ and $R_2$ represents hydrogen and the other one a substituent selected from the groups defined above or both $R_1$ and $R_2$ represent different substituents selected from the groups defined above.

In a preferred embodiment, $R_1$ and $R_2$ are identical in the compound (I). In that embodiment, both $R_1$ and $R_2$ represent substituents selected from the groups defined above.

In the embodiment wherein R is other than hydrogen, R represents a group of the partial formula

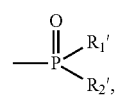

Wherein $R_1'$ and $R_2'$ are defined as $R_1$ and $R_2$.

In the compound (Ia), the definitions of $R_1'$ and $R_2'$ correspond to the definitions of $R_1$ and $R_2$.

Such compounds are represented by the general formula:

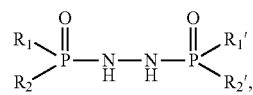

Wherein $R_1$ and $R_2$ independently of one another represent substituents selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono- or bicyclic $C_5$-$C_{20}$cycloalkyl, mono- or bicyclic $C_1$-$C_{12}$alkyl-$C_5$-$C_{20}$cycloalkyl, and mono- or bicyclic $C_5$-$C_{20}$cycloalkyl-$C_1$-$C_4$alkyl; and $R_1'$ and $R_2'$ are defined as $R_1$ and $R_2$.

In the embodiment wherein R represents hydrogen, the compounds (I) are represented by the general formula

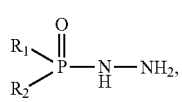
(Ib)

Wherein $R_1$ and $R_2$ independently of one another represent substituents selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono- or bicyclic $C_5$-$C_{20}$cycloalkyl, mono- or bicyclic $C_1$-$C_{12}$alkyl-$C_5$-$C_{20}$cycloalkyl, and mono- or bicyclic $C_5$-$C_{20}$cycloalkyl-$C_1$-$C_4$alkyl.

The term salt of a compound (I) comprises within its scope acid addition salts with proton donor acid, such as hydrochloric, hydrobromic or sulphuric acid, e.g. the hydrogen chloride or hydrogen bromide addition salt.

Compounds (1) are known according to E. Steininger, *Monatshefte für Chemie* 1966, 97(2), 383, or are obtainable by known methods, such as in a first step: reaction of a halophosphine oxide, such as chlorodiphenylphosphine oxide, to give a compound (Ib) and in a second step: reaction of that compound with another equivalent of a halophosphine to give a compound (Ia). Alternatively, compounds of the general formula (Ia) may also be obtained by a one-step reaction starting from hydrazine and halophosphine, as described by H. Bock and G. Rudolph, *Chemische Berichte* 1965, 98(7), 2273.

Component a) is preferably contained in the flame retardant compositions according to the invention in an amount from 0.1-45.0 wt. %, preferably 0.1-30.0 wt. %, based on the weight of the polymer substrate.

Component b)

The term polymer substrate comprises within its scope thermoplastic polymers or thermosets. Thermoplastic polymers are preferred. A list of suitable thermoplastic polymers is given below:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be cross linked), for example high density polymethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different and especially by the following methods:

a) Radical polymerisation (normally under high pressure and at elevated temperature).

b) Catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, and amine or silyl ether groups. These catalyst systems are usually termed Phillips, Standard Oil Indiana, Ziegler-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylenevinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch;

The homopolymers and copolymers mentioned above may have a stereo structure including syndiotactic, isotactic, hemi-isotactic or atactic; where atactic polymers are preferred. Stereo block polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyl toluene, all isomers of ethyl styrene, propyl styrene, vinyl biphenyl, vinyl naphthalene, and vinyl anthracene, and mixtures thereof. Homopolymers and copolymers may have a stereo structure including syndiotactic, isotactic, hemi-isotactic or atactic; where atactic polymers are preferred. Stereo block polymers are also included;

a) Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

b) Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

c) Hydrogenated aromatic polymers derived from hydrogenation of polymers mentioned under 6a). Homopolymers and copolymers may have a stereo structure including syndiotactic, isotactic, hemi-isotactic or atactic; where atactic polymers are preferred. Stereo block polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulphochlorinated polyethylene, copolymers of ethylene and chlorinated ethylene, epichlorohydrin homo- and copolymers, especially polymers of halogencontaining vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/-vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1 above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes, which contain ethylene oxide as a co-monomer; polyacetals modified with thermoplastic polyurethanes, acrylates or MBS.

14. Polyphenylene oxides and sulphides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and co-polyamides derived from diamines and dicarboxylic acids and/- or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or co-polyamides modified with EPDM or ABS; and polyamides condensed during processing (RIM polyamide systems).

17. Polyureas, polyimides, polyamide imides, polyether imides, polyester imides, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block co-polyether esters derived from hydroxyl-terminated polyethers; and also polyesters modified with polycarbonates or MBS.

19. Polyketones.

20. Polysulphones, polyether sulphones and polyether ketones.

21. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

22. Polycarbonates that correspond to the general formula:

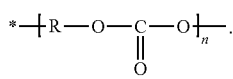

Such Polycarbonates are obtainable by interfacial processes or by melt processes (catalytic transesterification). The polycarbonate may be either branched or linear in structure and may include any functional substituents. Polycarbonate copolymers and polycarbonate blends are also within the scope of the invention. The term polycarbonate should be interpreted as inclusive of copolymers and blends with other thermoplastics. Methods for the manufacture of polycarbonates are known, for example, from U.S. Pat. Nos. 3,030,331; 3,169,121; 4,130,458; 4,263,201; 4,286,083; 4,552,704; 5,210,268; and 5,606,007. A combination of two or more polycarbonates of different molecular weights may be used.

Preferred are polycarbonates obtainable by reaction of a diphenol, such as bisphenol A, with a carbonate source. Examples of suitable diphenols are:

Bisphenol:

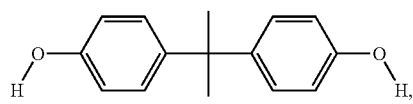

bisphenol AF:

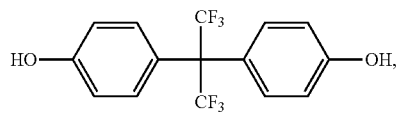

bisphenol AP:

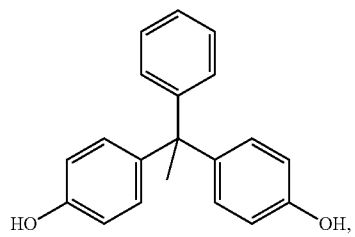

bisphenol B:

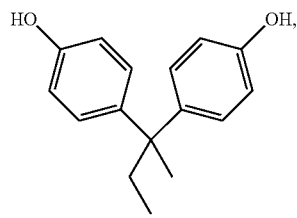

bisphenol C:

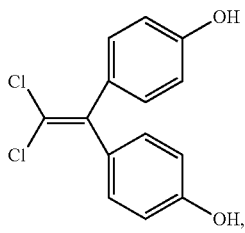

bisphenol E:

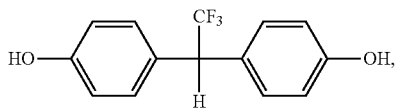

bisphenol F:

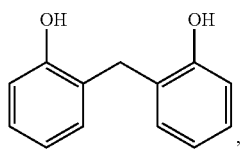

bisphenol M:

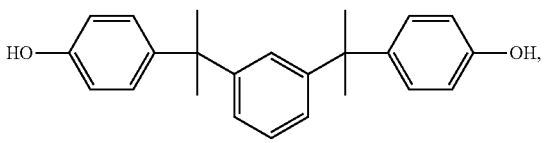

bisphenol P:

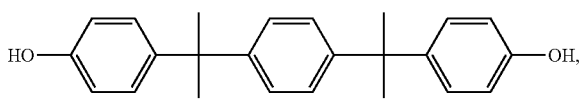

bisphenol S:

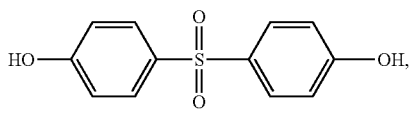

bisphenol TMC:

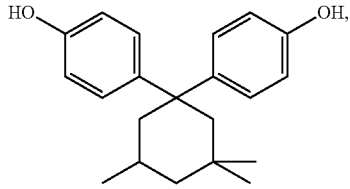

bisphenol Z:

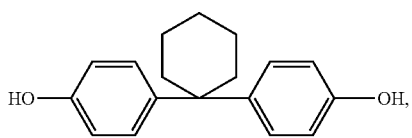

4,4'-(2-norbornylidene)bis(2,6-dichlorophenol), or fluorene-9-bisphenol:

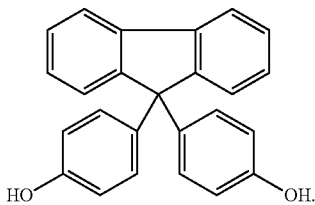

The carbonate source may be a carbonyl halide, a carbonate ester or a haloformate. Suitable carbonate halides are phosgene or carbonylbromide. Suitable carbonate esters are dialkylcarbonates, such as dimethyl- or diethylcarbonate, diphenyl carbonate, phenyl-alkylphenylcarbonate, such as phenyl-tolylcarbonate, dialkylcarbonates, such as dimethyl- or diethylcarbonate, di-(halophenyl)carbonates, such as di-(chlorophenyl)carbonate, di-(bromophenyl)carbonate, di-(trichlorophenyl)carbonate or di-(trichloroheny)arbonate, di-(alkylphenyl)carbonates, such as di-tolylcarbonate, naphthylcarbonate, dichloronaphthylcarbonate and others.

The polymer substrate mentioned above, in the event it comprises polycarbonates or polycarbonate blends, is a polycarbonate-copolymer, wherein isophthalate/terephthalate-resorcinol segments are present. Such polycarbonates are commercially available, e.g. Lexan® SLX (General Electrics Co. USA). Other polymeric substrates of component b) may additionally contain in the form as admixtures or as copolymers a wide variety of synthetic polymers including polyolefins, polystyrenes, polyesters, polyethers, polyamides, poly(meth)acrylates, thermoplastic polyurethanes, polysulphones, polyacetals and PVC, including suitable compatibilizing agents. For example, the polymer substrate may additionally contain thermoplastic polymers selected from the group of resins consisting of polyolefins, thermoplastic polyurethanes, styrene polymers and copolymers thereof. Specific embodiments include polypropylene (PP), polyethylene (PE), polyamide (PA), polybutylene terephthalate (PBT), polyethylene terephthalate (PET), glycol-modified polycyclohexylenemethylene terephthalate (PCTG), polysulphone (PSU), polymethylmethacrylate (PMMA), thermoplastic polyurethane (TPU), acrylonitrile-butaiene-styrene (ABS), acrylonitrile-styrene-acrylic ester (ASA), acrylonitrile-ethylene-propylene-styrene (AES), styrene-maleic anhydride (SMA) or high impact polystyrene (HIPS).

According to a further embodiment, the term polymer substrate of component b) consists of a polyfunctional epoxide compound, wherein at least two epoxy groups of the partial formula

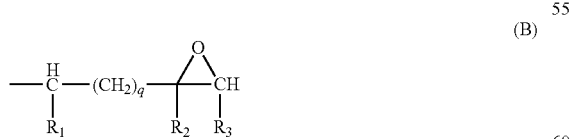

(B)

are present, which are attached directly to carbon, oxygen, nitrogen or sulphur atoms, and wherein q represents zero, $R_1$ and $R_3$ both represent hydrogen and $R_2$ represents hydrogen or methyl; or wherein q represents zero or 1, $R_1$ and $R_3$ together form the —$CH_2$—$CH_2$— or —$CH_2$—$CH_2$—$CH_2$— groups and $R_2$ represents hydrogen.

Examples of polyfunctional epoxide compounds are:
I) Polyglycidyl esters and poly(β-methylglycidyl) esters obtainable by reacting a compound having at least two carboxyl groups in the molecule with epichlorohydrin and/or glyceroldichlorohydrin and/or β-methylepichlorohydrin. The reaction is carried out in the presence of bases.
Suitable compounds having at least two carboxyl groups in the molecule are aliphatic polycarboxylic acids, such as glutaric, adipic, pimelic, suberic, azelaic, sebacic or dimerized or trimerized linoleic acid. Cycloaliphatic polycarboxylic acids are suitable, e.g. tetrahydrophthalic, 4-methyltetrahydrophthalic, hexahydrophthalic or 4-methylhexahydrophthalic acid.
Aromatic polycarboxylic acids are suitable, such as phthalic, isophthalic, trimellitic and pyromellitic acid. Likewise suitable are carboxyl-terminated adducts of, for example, trimellitic acid and polyols such as glycerol or 2,2-bis(4-hydroxycyclohexyl) propane.
II) Polyglycidyl ethers or poly(β-methylglycidyl)ethers obtainable by reacting a compound having at least two free alcoholic hydroxyl groups and/or phenolic hydroxyl groups with a suitably substituted epichlorohydrin under alkaline conditions or in the presence of an acidic catalyst with subsequent treatment under alkaline conditions.
Ethers of this type are derived, for example, from straight-chain alcohols, such as ethyleneglycol, diethyleneglycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins.
In the alternative, they are derived, for example, from cycloaliphatic alcohols, such as 1,3- or 1,4-dihydroxycyclohexane, bis(4-hydroxycyclohexyl)methane, 2,2-bis(4-hydroxycyclohexyl)-propane or 1,1-bis(hydroxymethyl)cyclohex-3-ene, or they possess aromatic nuclei, such as N,N-bis(2-hydroxyethyl)aniline or p,p'-bis(2-hydroxyethylamino)diphenylmethane.
The epoxy compounds may also be derived from mononuclear phenols, such as resorcinol or hydroquinone; or they are based on polynuclear phenols, such as bis(4-hydroxyphenyl)methane, 2,2-bis(4-hydroxyphenyl)propane, 2,2-bis(3,5-dibromo-4-hydroxyphenyl)-propane or 4,4'-dihydroxydiphenyl sulphone, or on condensates of phenols with formaldehyde that are obtained under acidic conditions, such as phenol Novolak®.
III) Poly(N-glycidyl) compounds obtainable by dehydrochlorinating the reaction products of epichlorohydrin with amines containing at least two amino hydrogen atoms. These amines are, for example, aniline, toluidine, n-butylamine, bis(4-aminophenyl)methane, m-xylylenediamine or bis(4-methylaminophenyl)methane, and also N,N,O-triglycidyl-m-aminophenol or N,N,O-triglycidyl-p-aminophenol.
The poly(N-glycidyl) compounds also include N,N'-diglycidyl derivatives of cycloalkylene-ureas, such as ethylene urea or 1,3-propyleneurea, and N,N'-diglycidyl derivatives of hydantoins, such as of 5,5-dimethylhydantoin.
IV) Poly(S-glycidyl) compounds, such as di-S-glycidyl derivatives derived from dithiols, such as ethane-1,2-dithiol or bis(4-mercaptomethylphenyl)ether.
Epoxy compounds having a radical of the partial formula B, in which $R_1$ and $R_3$ together are —$CH_2$—$CH_2$— and n is 0 are bis(2,3-epoxycyclopentyl)ether, 2,3-epoxycyclopentylglycidyl ether or 1,2-bis(2,3-epoxycyclopentyloxy)ethane. An example of an epoxy resin having a radical of the formula A in which $R_1$ and $R_3$ together are —$CH_2$—$CH_2$— and n is 1 is (3,4-epoxy-6-methylcyclohexyl)methyl 3',4'-epoxy-6'-methylcyclohexanecarboxylate.

Polyfunctional epoxide compounds are known. Many of them are commercially available from Huntsman Advanced Materials (brand name Araldite®). Examples of suitable polyfunctional epoxides are:

a) Liquid bisphenol A diglycidyl ethers, such as ARALDITE GY 240, ARALDITE GY 250, ARALDITE GY 260, ARALDITE GY 266, ARALDITE GY 2600, ARALDITE MY 790;
b) Solid bisphenol A diglycidyl ethers such as ARALDITE GT 6071, ARALDITE GT 7071, ARALDITE GT 7072, ARALDITE GT 6063, ARALDITE GT 7203, ARALDITE GT 6064, ARALDITE GT 7304, ARALDITE GT 7004, ARALDITE GT 6084, ARALDITE GT 1999, ARALDITE GT 7077, ARALDITE GT 6097, ARALDITE GT 7097, ARALDITE GT 7008, ARALDITE GT 6099, ARALDITE GT 6608, ARALDITE GT 6609, ARALDITE GT 6610;
c) Liquid bisphenol F diglycidyl ethers, such as ARALDITE GY 281, ARALDITE GY 282, ARALDITE PY 302, ARALDITE PY 306;
d) Solid polyglycidyl ethers of tetraphenylethane, such as CG Epoxy Resin® 0163;
e) Solid and liquid polyglycidyl ethers of phenol-formaldehyde Novolak®, such as EPN 1138, EPN 1139, GY 1180, PY 307;
f) Solid and liquid polyglycidyl ethers of o-cresol-formaldehyde NOVOLAK, such as ECN 1235, ECN 1273, ECN 1280, ECN 1299;
g) Liquid glycidyl ethers of alcohols, such as Shell® glycidyl ether 162, ARALDITE DY 0390, ARALDITE DY 0391;
h) Liquid glycidyl ethers of carboxylic acids, such as Shell® Cardura E terephthalic ester, trimellitic ester, ARALDITE PY 284;
i) Solid heterocyclic epoxy resins (triglycidyl isocyanurate), such as ARALDITE PT 810;
k) Liquid cycloaliphatic epoxy resins, such as ARALDITE CY 179;
l) Liquid N,N,O-triglycidyl ethers of p-aminophenol, such as ARALDITE MY 0510;
m) Tetraglycidyl-4,4'-methylenebenzamine or N,N,N',N-tetraglycidyldiaminohenylmethane, such as ARALDITE MY 720, ARALDITE MY 721.

If desired, a mixture of epoxy compounds of diffe'rent structure can also be employed.

The presence of a conventional hardener component is an optional but a preferred embodiment in the composition. A suitable hardener compound is any of the known hardeners for epoxy resins. The amine, phenolic and anhydride hardeners are particularly preferred, such as polyamines, e.g. ethylenediamine, diethylenetriamine, triethylenetetramine, hexamethylenediamine, methanediamine, N-aminoethyl piperazine, diaminodiphenylmethane [DDM], alkyl-substituted derivatives of DDM, isophoronediamine [IPD], diaminodiphenylsulphone [DDS], 4,4-methylenedianiline [MDA], or m-phenylenediamine [MPDA]), polyamides, alkyl/alkenyl imidazoles, dicyanodiamide [DICY], 1,6-hexamethylene-bis-cyanoguanidine, phenolic hardeners such as phenol novolac and cresol novolac, or acid anhydrides, e.g. dodecenylsuccinic acid anhydride, hexahydrophthalic acid anhydride, tetrahydrophthalic acid anhydride, phthalic acid anhydride, pyromellitic acid anhydride, styrene-maleic acid anhydride copolymers, and derivatives thereof.

Additional Components

The instant invention further pertains to a composition, which comprises, in addition to the components a) and b), as defined above, as optional components, additional flame retardants and further additives selected from the group consisting of so-called anti-dripping agents, polymer stabilizers, tetraalkylpiperidine and tetraalkylpiperazine derivatives.

According to a preferred embodiment the composition contains additional flame retardants selected from the group consisting of phosphorus containing flame retardants, nitrogen containing flame retardants, halogenated flame retardants and inorganic flame retardants. Such additional flame retardants are known components, items of commerce or can be obtained by known methods.

Representative phosphorus-containing flame retardants are for example:

Aluminum salts of di-$C_1$-$C_4$alkylphosphinic acid, such as dimethylphosphinic acid, diethylphosphinic acid (DEPAL) or methyl-ethylphospinic acid (MEPAL), tetraphenyl resorcinol diphosphate (Fyrolflex® RDP, Akzo Nobel), resorcinol diphosphate oligomer (RDP), triphenyl phosphate, ethylenediamine diphosphate (EDAP), diethyl-N,N-bis(2-hydroxyethyl)-aminomethyl phosphonate, hydroxyalkyl esters of phosphorus acids, salts of hypophosphoric acid ($H_3PC_2$) comprising e.g. $Ca^{2+}$, $Zn^{2+}$, or $Al^{3+}$ as cations, tetrakis(hydroxymethyl)phosphonium sulphide, ammonium polyphosphate and phosphazene flame-retardants.

Nitrogen containing flame retardants are, for example, isocyanurate flame retardants, such as polyisocyanurate, esters of isocyanuric acid or isocyanurates. Representative examples are hydroxyalkyl isocyanurates, such as tris-(2-hydroxyethyl)isocyanurate, tris(hydroxymethyl)isocyanurate, tris(3-hydroxy-n-proyl)isocyanurate or triglycidyl isocyanurate.

Nitrogen containing flame-retardants include further melamine-based flame-retardants. Representative examples are: melamine cyanurate, melamine borate, melamine phosphate, melamine pyrophosphate, melamine polyphosphate, melamine ammonium polyphosphate, melamine ammonium pyrophosphate, dimelamine phosphate and dimelamine pyrophosphate.

Further examples are: benzoguanamine, tris(hydroxyethyl) isocyanurate, allantoin, glycoluril, melamine cyanurate, melamine phosphate, dimelamine phosphate, urea cyanurate, ammonium polyphosphate, a condensation product of melamine from the series melem, melam, melon and/or a higher condensed compound or a reaction product of melamine with phosphoric acid or a mixture thereof.

Representative organohalogen flame retardants are, for example:

Polybrominated diphenyl oxide (DE-60F, Great Lakes Corp.), decabromodiphenyl oxide (DBDPO; Saytex® 102E), tris[3-bromo-2,2-bis(bromomethyl)propyl]phosphate (PB 370®, FMC Corp.), tris(2,3-dibromopropyl)phosphate, tris (2,3-dichloropropyl)phosphate, chlorendic acid, tetrachlorophthalic acid, tetrabromophthalic acid, poly-β-chloroethyl triphosphonate mixture, tetrabromobisphenol A bis(2,3-dibromopropyl ether) (PE68), brominated epoxy resin, ethylene-bis(tetrabromophthalimide) (Saytex® BT-93), bis (hexachlorocyclopentadieno)cyclooctane (Declorane Plus®), chlorinated paraffins, octabromodiphenyl ether, hexachlorocyclopentadiene derivatives, 1,2-bis(tribromophenoxy)ethane (FF680), tetrabromo-bisphenol A (Saytex® RB100), ethylene bis(dibromo-norbornanedicarboximide) (Saytex® BN-451), bis-(hexachlorocycloentadeno) cyclooctane, PTFE, tris-(2,3-dibromopropyl)-isocyanurate, and ethylene-bis-tetrabromophthalimide.

The flame retardants mentioned above are routinely combined with an inorganic oxide synergist. Most common for this use are zinc or antimony oxides, e.g. $Sb_2O_3$ or $Sb_2O_5$. Boron compounds are suitable, too.

Representative inorganic flame retardants include, for example, aluminum trihydroxide (ATH), boehmite (AlOOH), magnesium dihydroxide (MDH), zinc borates, $CaCO_3$, (organically modified) layered silicates, (organically modified) layered double hydroxides, and mixtures thereof.

The above-mentioned additional flame retardant classes are advantageously contained in the composition of the invention in an amount from about 0.5% to about 45.0% by weight of the organic polymer substrate; for instance about 1.0% to about 40.0%; for example about 5.0% to about 35.0% by weight of the polymer or based on the total weight of the composition.

According to another embodiment, the invention relates to a composition which additionally comprises as additional component so-called anti-dripping agents.

These anti-dripping agents reduce the melt flow of the thermoplastic polymer and inhibit the formation of drops at high temperatures. Various references, such as U.S. Pat. No. 4,263,201, describe the addition of anti-dripping agents to flame retardant compositions.

Suitable additives that inhibit the formation of drops at high temperatures include glass fibers, polytetrafluoroethylene (PTFE), high temperature elastomers, carbon fibers, glass spheres and the like.

The addition of polysiloxanes of different structures has been proposed in various references; cf. U.S. Pat. Nos. 6,660,787, 6,727,302 or 6,730,720.

Stabilizers are preferably halogen-free and selected from the group consisting of nitroxyl stabilizers, nitrone stabilizers, amine oxide stabilizers, benzofuranone stabilizers, phosphite and phosphonite stabilizers, quinone methide stabilizers and monoacrylate esters of 2,2'-alkylidenebisphenol stabilizers.

As mentioned above, the composition according to the invention may additionally contain one or more conventional additives, for example selected from pigments, dyes, plasticizers, antioxidants, thixotropic agents, levelling assistants, basic co-stabilizers, metal passivators, metal oxides, organophosphorus compounds, further light stabilizers and mixtures thereof, especially pigments, phenolic antioxidants, calcium stearate, zinc stearate, UV absorbers of the 2-hydroxy-benzophenone, 2-(2'-hydroxyphenyl)benzotriazole and/or 2-(2-hydroxyphenyl)-1,3,5-triazine groups.

Preferred additional additives for the compositions as defined above are processing stabilizers, such as the above-mentioned phosphites and phenolic antioxidants, and light stabilizers, such as benzotriazoles. Preferred specific antioxidants include octadecyl 3-(3,5-di-tert-butyl-4-hydroxyphenyl) propionate (IRGANOX 1076), pentaerythritoltetrakis[3-(3,5-di-tert-butyl-4-hydroxyphenyl)propionate] (IRGANOX 1010), tris(3,5-di-tert-butyl-4-hydroxyphenyl)isocyanurate (IRGANOX 3114), 1,3,5-trimethyl-2,4,6-tris(3,5-di-tert-butyl-4-hydroxybenzyl)benzene (IRGANOX 1330), triethyleneglycolbis[3-(3-tert-butyl-4-hydroxy-5-methylphenyl) propionate] (IRGANOX 245), and N,N'-hexane-1,6-diyl-bis [3-(3,5-di-tert-butyl-4-hydroxyphenyl)propionamide] (IRGANOX 1098). Specific processing stabilizers include tris(2,4-di-tert-butylphenyl) phosphite (IRGAFOS 168), 3,9-bis(2,4-di-tert-butylphenoxy)-2,4,8,10-tetraoxa-3,9-diphosphaspiro[5.5]undecane (IRGAFOS 126), 2,2',2"-nitrilo[triethyl-tris(3,3',5,5'-tetra-tert-butyl-1,1'-biphenyl-2,2'-diyl)] phosphite (IRGAFOS 12), and tetrakis(2,4-di-tert-butylphenyl)-[1,1-biphenyl]-4,4'-diylbisphosphonite (IRGAFOS P-EPQ). Specific light stabilizers include 2-(2H-benzotriazole-2-yl)-4,6-bis(1-methyl-1-phenylethyl)phenol (TINUVIN 234), 2-(5-chloro(2H)-benzotriazole-2-yl)-4-(methyl)-6-(tert-butyl)phenol (TINUVIN 326), 2-(2H-benzotriazole-2-yl)-4-(1,1,3,3-tetramethylbutyl)phenol (TINUVIN 329), 2-(2H-benzotriazole-2-yl)-4-(tert-butyl)-6-(sec-butyl)phenol (TINUVIN 350), 2,2'-methylenebis(6-(2H-benzotriazol-2-yl)-4-(1,1,3,3-tetramethylbutyl)phenol) (TINUVIN 360), and 2-(4,6-diphenyl-1,3,5-triazin-2-yl)-5-[(hexyl)oxy]-phenol (TINUVIN 1577), 2-(2'-hydroxy-5'-methylphenyl)benzotriazole (TINUVIN P), 2-hydroxy-4-(octyloxy)benzophenone (CHIMASSORB 81), 1,3-bis-[(2'-cyano-3',3'-diphenylacryloyl)oxy]-2,2-bis-{[(2'-cyano-3', 3"-diphenylacryloyl)oxy]methyl}-propane (UVINUL 3030, BASF), ethyl-2-cyano-3,3-diphenylacrylate (UVINUL 3035, BASF), and (2-ethylhexyl)-2-cyano-3,3-diphenylacrylate (UVINUL 3039, BASF).

The additives mentioned above are preferably contained in an amount of 0.01 to 10.0%, especially 0.05 to 5.0%, relative to the weight of the polymer substrate b).

According to a preferred embodiment, the composition additionally comprises at least one tetraalkylpiperidine or tetraalkylpiperazine derivative selected from the group that consists of 2,2,6,6-tetraalkylpiperidine-1-oxides, 1-hydroxy-2,2,6,6-tetraalkylpiperidines, 1-alkoxy-2,2,6,6-tetraalkylpiperidines, 1-acyloxy-2,2,6,6-piperidines, 1-hydroxy-2,2,6,6-tetraalkylpiperazines, 1-alkoxy-2,2,6,6-tetraalkylpiperazines and 1-acyloxy-2,2,6,6-piperazines.

Such compounds can be illustrated by the partial formulae

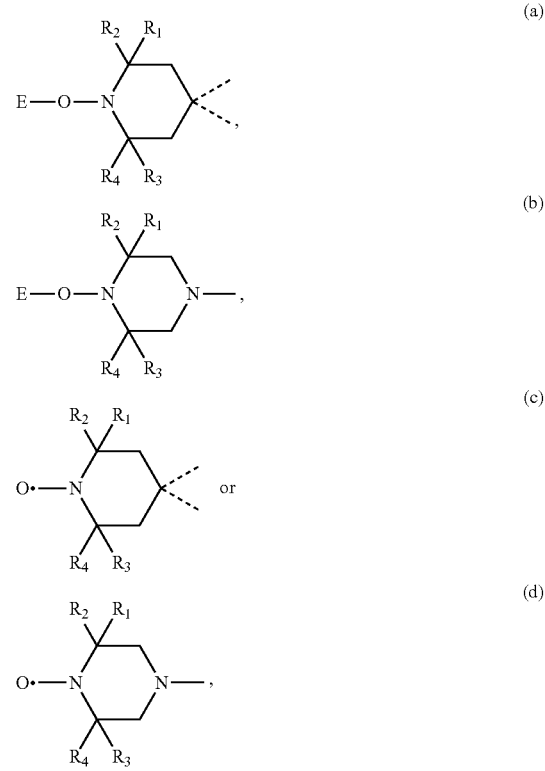

Wherein $R_1$-$R_4$ represent $C_1$-$C_4$ alkyl, preferably methyl or ethyl. According to preferred embodiments, one of $R_1$ and $R_2$ and one of $R_3$ of $R_4$ represents ethyl and the other ones represent methyl or all of $R_1$-$R_4$ represent methyl; and E represents hydrogen, $C_1$-$C_{20}$alkyl, $C_5$-$C_6$cycloalkyl or $C_2$-$C_{20}$alkyl, $C_5$-$C_6$cycloalkyl or $C_2$-$C_{20}$alkenyl with additional substituents; or represents the acyl group of a $C_1$-$C_{20}$monocarboxylic or $C_2$-$C_{20}$dicarboxylic acid.

In the compounds that correspond to the partial formula a, one of the dotted lines in 4-position of the piperidine represents a bond to hydrogen or an N-substituent and the other one represents a bond to an O-substituent or a C-substituent.

In the alternative, both dotted lines in 4-position of the piperidine represent bonds to hydrogen, O-substituents or C-substituents or represent a double bond to oxygen.

In the compounds that correspond to the partial formula b, the nitrogen in 4-position of the piperazine is bonded to hydrogen or carbon-substituents.

Representative structural formulae are given below:

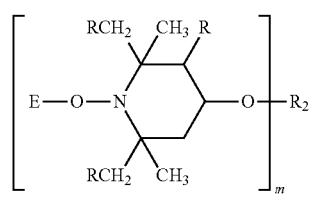
(B)

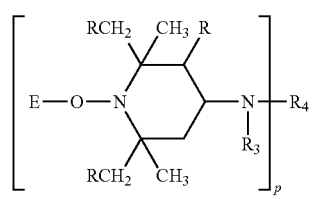
(C)

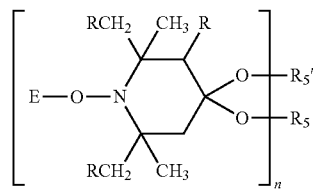
(D)

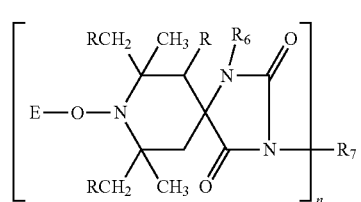
(E)

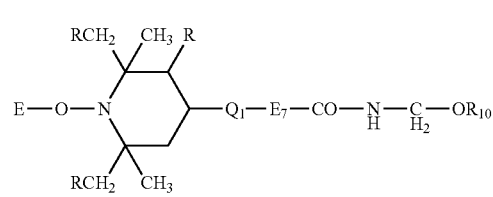
(F)

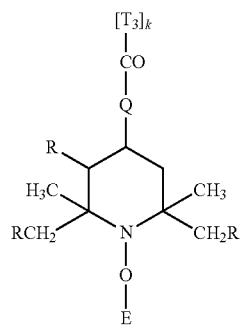
(G)

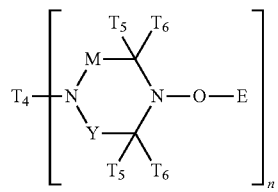
(H)

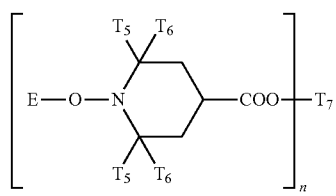
(I)

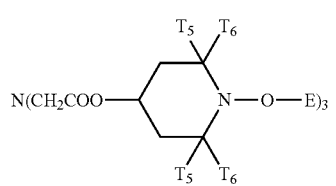
(K)

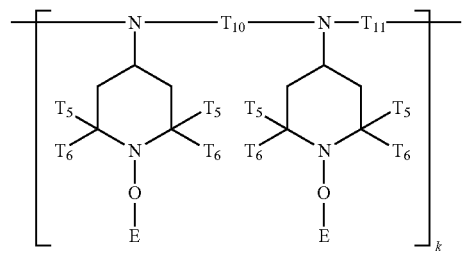
(L)

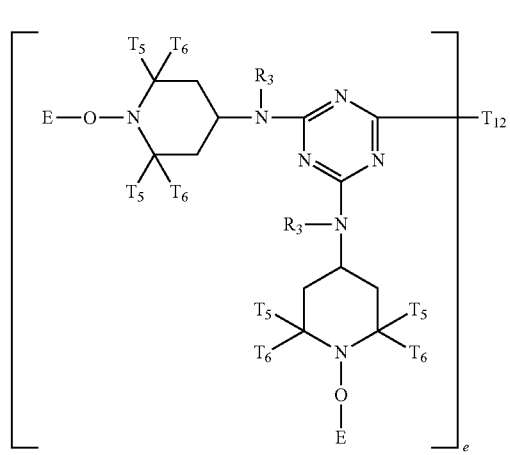
(M)

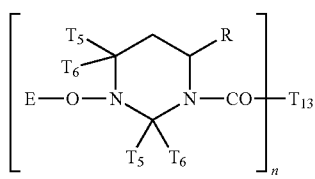
(N)

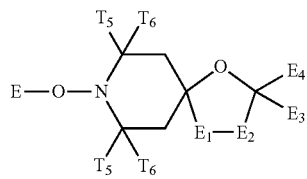
(O)

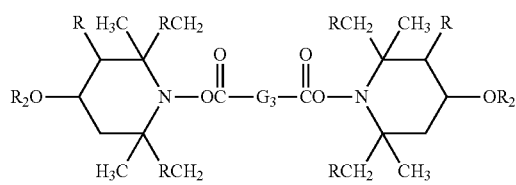
(P)

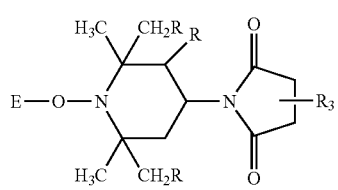
(Q)

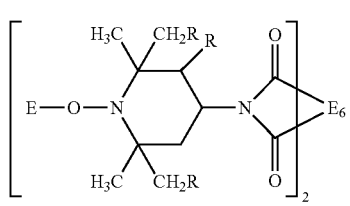
(R)

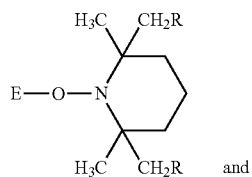
and
(S)

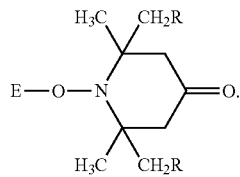
(T)

In these compounds E represents hydrogen, $C_1$-$C_{20}$alkyl, $C_5$-$C_6$cycloalkyl or $C_2$-$C_{20}$alkyl, $C_5$-$C_6$cycloalkyl or $C_2$-$C_{20}$alkenyl with additional substituents; or represents the acyl group of a $C_1$-$C_{20}$monocarboxylic or $C_2$-$C_{20}$dicarboxylic acid; or, in the alternative, the group >N—O-E is replaced with the group >N—O.

Alkyl is straight or branched and is for example methyl, ethyl, n-propyl, n-butyl, sec-butyl, tert-butyl, n-hexyl, n-octyl, 2-ethylhexyl, n-nonyl, n-decyl, n-undecyl, n-dodecyl, ntridecyl, n-tetradecyl, n-hexadecyl or n-octadecyl.

Cycloalkyl groups include cyclopentyl and cyclohexyl; typical cycloalkenyl groups include cyclohexenyl; while typical aralkyl groups include benzyl, α-methyl-benzyl, α,α-dimethylbenzyl or phenethyl.

E defined as the acyl group of a $C_1$-$C_{20}$monocarboxylic acid is preferably an acyl radical selected from the group consisting of —C(=O)—H, —C(=O)—$C_1$-$C_{19}$alkyl, —C(=O)—$C_2$-$C_{19}$alkenyl, —C(=O)—$C_2$-$C_4$alkenyl-$C_6$-$C_{10}$aryl, —C(=O)—$C_6$-$C_{10}$aryl, —C(=O)—O—$C_1$-$C_6$alkyl, —C(=O)—O—$C_6$-$C_{10}$aryl, —C(=O)—NH—$C_1$-$C_6$alkyl, —C(=O)—NH—$C_6$-$C_{10}$aryl and —C(=O)—N($C_1$-$C_6$alkyl)$_2$.

E defined as the acyl group of a $C_2$-$C_{20}$dicarboxylic acid is, for example, the diacyl radical derived from a monobasic organic acid having C radicals and two acid functions, e.g. a diacyl radical derived from an aliphatic, aromatic or cycloaliphatic dicarboxylic acid.

Suitable aliphatic dicarboxylic acids have from 2 to 40 C-atoms, e.g. oxalic acid, malonic acid, dimethylmalonic acid, succinic acid, pimelic acid, adipic acid, trimethyladipic acid, sebacic acid, azelaic acid and dimeric acid (dimerization products of unsaturated aliphatic carboxylic acids such as oleic acid), alkylated malonic and succinic acids, e.g. octadecylsuccinic acid.

Suitable cycloaliphatic dicarboxylic acids are, for example, 1,3-cyclobutanedicarboxylic acid, 1,3-cyclopentanedicarboxylic acid, 1,3- and 1,4-cyclohexanedicarboxylic acid, 1,3- and 1,4-(dicarboxymethyl)cyclohexane or 4,4'-dicyclohexyldicarboxylic acid.

Preferred members of this group include the acyl radical of oxalic acid, adipic acid, succinic acid, suberic acid, sebacic acid, phthalic acid dibutylmalonic acid, dibenzylmalonic acid or butyl-(3,5-di-tert-butyl-4-hydropxybenzyl)-malonic acid, or bicycloheptenedicarboxylic acid, with succinates, sebacates, phthalates and isophthalates being specific examples.

If E is a divalent acyl radical of a dicarbamic acid, it is for example an acyl radical of hexamethylenedicarbamic acid or of 2,4-toluoylenedicarbamic acid;

T is a straight or branched chain alkylene of 1 to 18 C-atoms, cycloalkylene of 5 to 18 C-atoms, cycloalkenylene of 5 to 18 C-atoms, a straight or branched chain alkylene of 1 to 4 C-atoms substituted by phenyl or by phenyl substituted by one or two alkyl groups of 1 to 4 C-atoms;

b is 1, 2 or 3 with the proviso that b does not exceed the number of C-atoms in T, and when b is 2 or 3, each hydroxyl group is attached to a different C-atoms of T;

R is hydrogen or methyl; and m is 1 to 4.

In the compounds mentioned above when the variable m is 1, $R_2$ is hydrogen, $C_1$-$C_{18}$alkyl or said alkyl optionally interrupted by one or more oxygen atoms, $C_2$-$C_{12}$alkenyl, $C_6$-$C_{10}$aryl, $C_7$-$C_{18}$aralkyl, glycidyl, the monovalent acyl radical of an aliphatic, cycloaliphatic or aromatic carboxylic acid, or a carbamic acid, for example an acyl radical of an aliphatic carboxylic acid having 2-18 C-atoms, of a cycloaliphatic carboxylic acid having 5-12 C-atoms or of an aromatic carboxylic acid having 7-15 C-atoms, or represents groups of the partial formulae

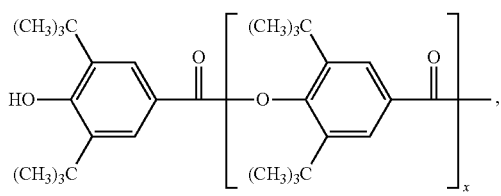

wherein x is 0 or 1,

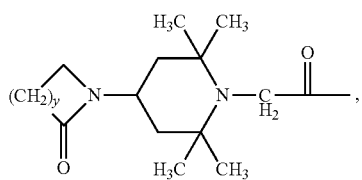

wherein y is 2-4;
When m is 2,
R₂ is C₁-C₁₂alkylene, C₄-C₁₂alkenylene, xylylene, a divalent acyl radical of an aliphatic, cycloaliphatic, araliphatic or aromatic dicarboxylic acid or of a dicarbamic acid, for example an acyl radical of an aliphatic dicarboxylic acid having 2-18 C-atoms, of a cycloaliphatic or aromatic dicarboxylic acid having 8-14 C-atoms, or of an aliphatic, cycloaliphatic or aromatic dicarbamic acid having 8-14 C-atoms;
Or represents groups of the partial formulae

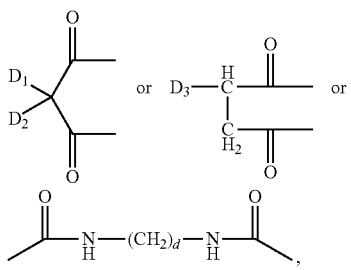

Wherein
D₁ and D₂ are independently hydrogen, C₁-C₈ alkyl, aryl or aralkyl including the 3,5-di-tbutyl-4-hydroxybenzyl radical;
D₃ is hydrogen, C₁-C₁₈alkyl or C₁-C₂₀alkenyl; and
d is 0-20;
When m is 3,
R₂ is a trivalent acyl radical of an aliphatic, unsaturated aliphatic, cycloaliphatic, or aromatic tricarboxylic acid;
When m is 4,
R₂ is a tetravalent acyl radical of a saturated or unsaturated aliphatic or aromatic tetracarboxylic acid including 1,2,3,4-butanetetracarboxylic acid, 1,2,3,4-but-2-enetetracarboxylic, and 1,2,3,5- and 1,2,4,5-pentanetetracarboxylic acid;
In the compounds mentioned above when the variable p is 1, 2 or 3,
R₃ is hydrogen, C₁-C₁₂alkyl, C₅-C₇cycloalkyl, C₇-C₉aralkyl, C₂-C₁₈alkanoyl, C₃-C₅alkenoyl or benzoyl;
When p is 1,
R₄ is hydrogen, C₁-C₁₈alkyl, C₅-C₇cycloalkyl, C₂-C₈alkenyl, unsubstituted or substituted by cyano, carbonyl or carbamide, or is aryl, aralkyl, or glycidyl, a group of the partial formula —CH₂—CH(OH)—Z or of the partial formulae —CO—Z or —CONH—Z, wherein Z is hydrogen, methyl or phenyl, or represents groups of the partial formulae

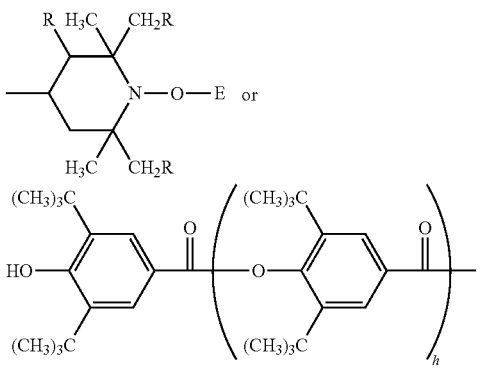

where h is 0 or 1;
R₃ and R₄ together, when p is 1, represents alkylene of 4 to 6 C-atoms, or 2-oxo-polyalkylene, or the cyclic acyl radical of an aliphatic or aromatic 1,2- or 1,3-dicarboxylic acid;
When p is 2,
R₄ is a direct bond or is C₁-C₁₂alkylene, C₈-C₁₂arylene, xylylene, a —CH₂CH(OH)—CH₂— group or a group of the partial formula —CH₂—CH(OH)—CH₂—O—X—O—CH₂—CH(OH)—CH₂—, wherein X is C₂-C₁₀alkylene, C₈-C₁₅arylene or C₈-C₁₂cycloalkylene; or, provided that R₃ is other than alkanoyl, alkenoyl or benzoyl, R₄ additionally represents the divalent acyl radical of an aliphatic, cycloaliphatic or aromatic dicarboxylic acid or dicarbamic acid, or represents the group —CO—; or
R₄ represents a group of the partial formula

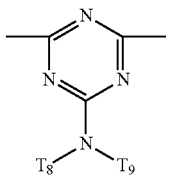

where T₈ and T₉ are independently hydrogen, C₁-C₁₈alkyl, or T₈ and T₉ together represent C₄-C₈alkylene or 3-oxapentamethylene, for instance T₈ and T₉ together are 3-oxapentamethylene;
When p is 3,
R₄ is 2,4,6-triazinyl;
n is 1 or 2;
When n is 1,
R₅ and R'₅ are independently C₁-C₁₂alkyl, C₂-C₁₂alkenyl, C₇-C₁₂aralkyl, or R₅ additionally represents hydrogen, or R₅ and R'₅ together are C₂-C₈alkylene or hydroxyalkylene or C₄-C₂₄acyloxyalkylene;
When n is 2,
R₅ and R'₅ together are a group of the partial formula (—CH₂)₂C(CH₂—)₂;
R₆ is hydrogen, C₁-C₁₂alkyl, allyl, benzyl, glycidyl or C₂-C₆alkoxyalkyl; or
When n is 1,
R₇ is hydrogen, C₁-C₁₂alkyl, C₃-C₅alkenyl, C₇-C₉aralkyl, C₅-C₇cycloalkyl, C₂-C₄hydroxyalkyl, C₂-C₆alkoxyalkyl, C$_6$-C$_{10}$ aryl, glycidyl, a group of the partial formula —(CH$_2$)$_t$—COO-Q or of the partial formula —(CH$_2$)$_t$—O—CO-Q wherein t is 1 or 2, and Q is C$_1$-C$_4$alkyl or phenyl; or when n is 2, R$_7$ is C$_2$-C$_{12}$alkylene, C$_6$-C$_{12}$arylene, a group of the partial formula

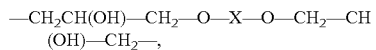
—CH$_2$CH(OH)—CH$_2$—O—X—O—CH$_2$—CH(OH)—CH$_2$—,

Wherein X is C$_2$-C$_{10}$alkylene, C$_6$-C$_{15}$arylene or C$_6$-C$_{12}$cycloalkylene, or a group of the partial formula

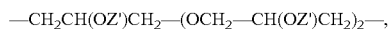
—CH$_2$CH(OZ')CH$_2$—(OCH$_2$—CH(OZ')CH$_2$)$_2$—,

Wherein Z' is hydrogen, C$_1$-C$_{18}$alkyl, allyl, benzyl, C$_2$-C$_{12}$alkanoyl or benzoyl;

Q$_1$ is —N(R$_8$)— or —O—; E$_7$ is C$_1$-C$_3$ alkylene, the group —CH$_2$—CH(R$_9$)—O— wherein R$_9$ is hydrogen, methyl or phenyl, the group —(CH$_2$)$_3$—NH— or a direct bond;

R$_{10}$ is hydrogen or C$_1$-C$_{18}$ alkyl, R$_8$ is hydrogen, C$_1$-C$_{18}$alkyl, C$_5$-C$_7$cycloalkyl, C$_7$-C$_{12}$aralkyl, cyanoethyl, C$_6$-C$_{10}$aryl, the group —CH$_2$—CH(R$_9$)—OH wherein R$_9$ has the meaning defined above; or represents groups of the partial formulae

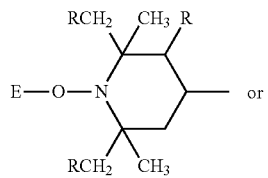

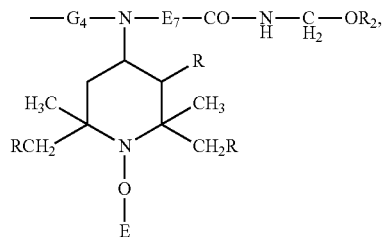

Wherein G$_4$ is C$_2$-C$_6$alkylene or C$_6$-C$_{12}$arylene; or R$_8$ is a group of the partial formula -E$_7$-CO—NH—CH$_2$—OR$_{10}$;

Formula F denotes a recurring structural unit of a polymer where T$_3$ is ethylene or 1,2-propylene, is the repeating structural unit derived from an α-olefin copolymer with an alkyl acrylate or methacrylate; for example a copolymer of ethylene and ethyl acrylate, and where k is 2 to 100;

T$_4$ has the same meaning as R$_4$ when p is 1 or 2;

T$_5$ is methyl;

T$_6$ is methyl or ethyl, or T$_5$ and T$_6$ together are tetramethylene or pentamethylene, for instance T$_5$ and T$_6$ are each methyl;

M and Y are independently methylene or carbonyl, and T$_4$ is ethylene where n is 2;

T$_7$ is as defined as R$_7$, and T$_7$ is for example octamethylene where n is 2;

T$_{10}$ and T$_{11}$ are independently alkylene of 2 to 12 C-atoms; or T$_{11}$ represents a group of the partial formula

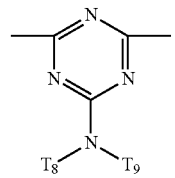

T$_{12}$ is piperazinyl, or represents groups of the partial formulae

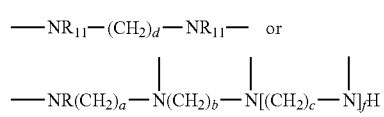

where R$_{11}$ is as defined as R$_3$ or additionally represents a group of the partial formula

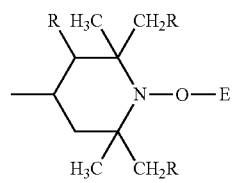

a, b and c are independently 2 or 3, and f is 0 or 1, for instance a and c are each 3, b is 2 and f is 1; and e is 2, 3 or 4, for example 4;

T$_{13}$ is the same as R$_2$ with the proviso that T$_{13}$ is other than hydrogen when n is 1;

E$_1$ and E$_2$, being different, each are —CO— or —N(E$_5$)— where E$_5$ is hydrogen, C$_1$-C$_{12}$alkyl or C$_4$-C$_{24}$alkoxycarbonylalkyl, for instance E$_1$ is —CO— and E$_2$ is —N(E$_5$)—;

E$_3$ is hydrogen, C$_1$-C$_{30}$alkyl, phenyl, naphthyl, said phenyl or said naphthyl substituted by chlorine or by C$_1$-C$_4$alkyl, or C$_7$-C$_{12}$-phenylalkyl, or said phenylalkyl substituted by C$_1$-C$_4$alkyl of 1 to 4 C-atoms;

E$_4$ is hydrogen, alkyl of 1 to 30 C-atoms, phenyl, naphthyl or phenylalkyl of 7 to 12 C-atoms, or E$_3$ and E$_4$ together are polymethylene of 4 to 17 C-atoms, or said polymethylene substituted by up to four C$_1$-C$_4$alkyl groups, for example methyl;

E$_6$ is an aliphatic or aromatic tetravalent radical;

R$_2$ of formula (N) is a previously defined when m is 1;

G$_1$ a direct bond, C$_1$-C$_{12}$ alkylene, phenylene or —NH-G'—NH wherein G' is C$_1$-C$_{12}$ alkylene.

Suitable tetraalkylpiperidine or tetralkylpiperazine derivatives are, for example, compounds of the formulae 1-12:

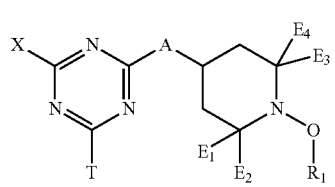
(1)

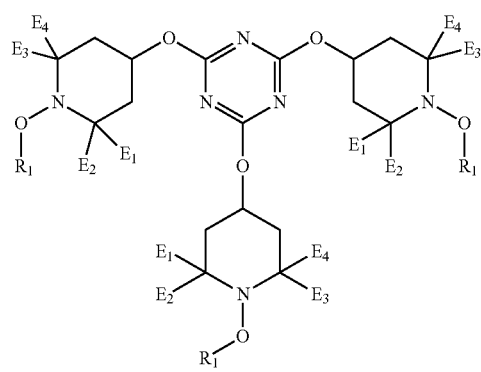
(2)
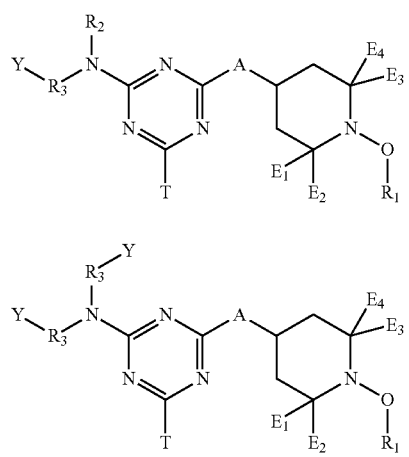
(3)
(4)
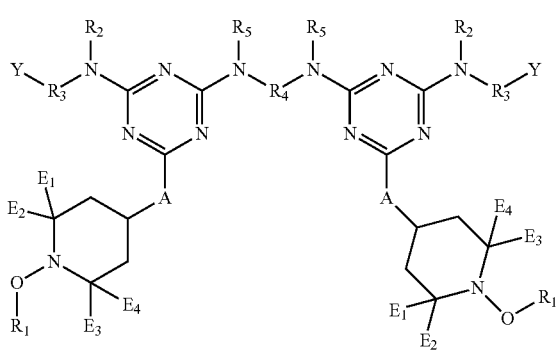
(5)
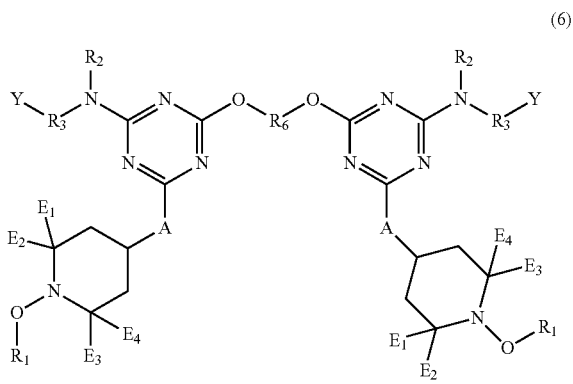
(6)
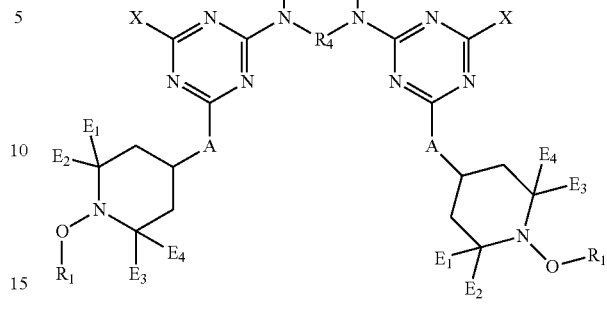
(7)
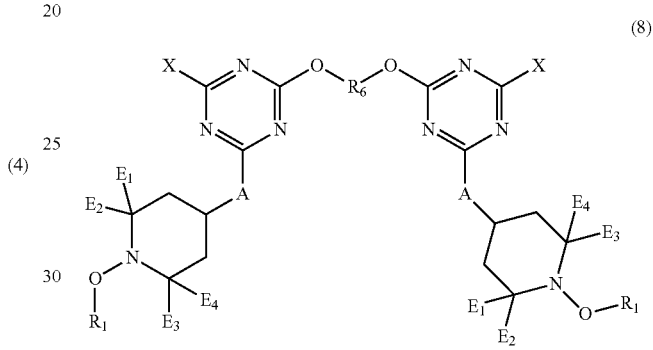
(8)
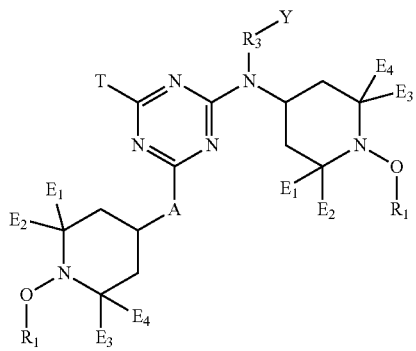
(9)
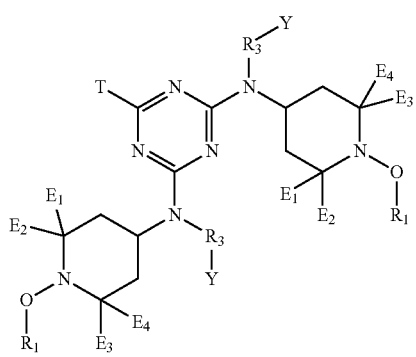
(10)

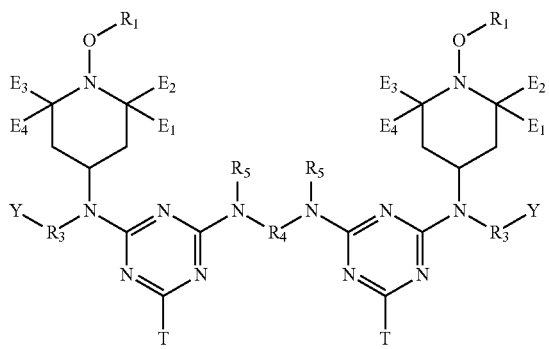

(11)

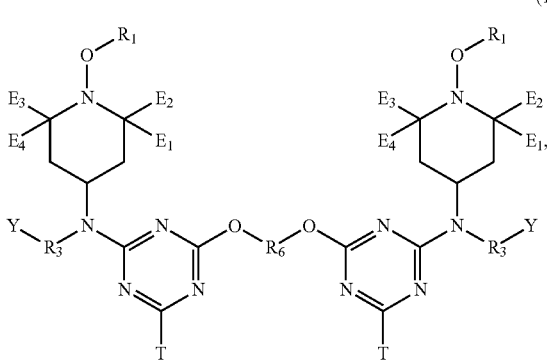

(12)

wherein $E_1$, $E_2$, $E_3$ and $E_4$ are independently $C_1$-$C_4$alkyl, or $E_1$ and $E_2$ are independently $C_1$-$C_4$alkyl and $E_3$ and $E_4$ taken together are pentamethylene, or $E_1$ and $E_2$; and $E_3$ and $E_4$ each taken together are pentamethylene;

$R_1$ is $C_1$-$C_{18}$alkyl, $C_5$-$C_{12}$cycloalkyl, a bicyclic or tricyclic hydrocarbon radical of 7 to 12 carbon atoms, $C_7$-$C_{15}$-phenylalkyl, $C_6$-$C_{10}$aryl or said aryl substituted by one to three $C_1$-$C_8$alkyl;

$R_2$ is hydrogen or a linear or branched chain $C_1$-$C_{12}$ alkyl;

$R_3$ is alkylene of 1 to 8 carbon atoms, or $R_3$ is —CO—, —CO—$R_4$—, —CONR$_2$—, or —CO—NR$_2$—R$_4$—;

$R_4$ is $C_1$-$C_8$ alkylene;

$R_5$ is hydrogen, linear or branched chain $C_1$-$C_{12}$alkyl, or represents a group of the partial formula

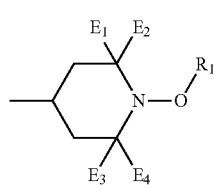

Or, when $R_4$ is ethylene, two $R_5$ methyl substituents can be linked by a direct bond with the triazine bridging group —N($R_5$)—$R_4$—N($R_5$)— forming a piperazin-1,4-diyl group;

$R_6$ is $C_2$-$C_8$alkylene or represents a group of the partial formula

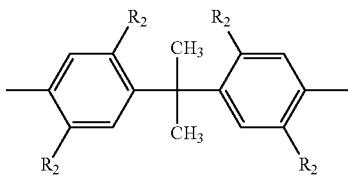

with the proviso that Y is other than —OH when $R_6$ is the structure depicted above;

A is —O— or —NR$_7$— where $R_7$ is hydrogen, straight or branched chain $C_1$-$C_{12}$alkyl; or $R_7$ is a group of the partial formula

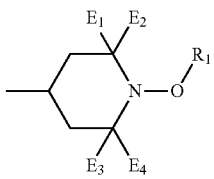

T is phenoxy, phenoxy substituted by one or two $C_1$-$C_8$alkyl or $C_1$-$C_8$alkoxy or —N($R_2$)$_2$ with the stipulation that $R_2$ is other than hydrogen; or T is a group of the partial formula

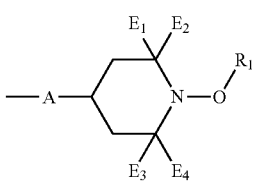

X is —NH$_2$, —NCO, —OH, —O-glycidyl, or —NHNH$_2$, and

Y is —OH, —NH$_2$, —NHR$_2$ where $R_2$ is other than hydrogen; or Y is —NCO, —COOH, oxiranyl, —O-glycidyl, or —Si(OR$_2$)$_3$;

Or the combination $R_3$—Y— is —CH$_2$CH(OH)R$_2$ where $R_2$ is alkyl or said alkyl interrupted by one to four oxygen atoms, or $R_3$—Y— is —CH$_2$OR$_2$; or Wherein the hindered amine compound is a mixture of N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamine; N,N',N'''-tris{2,4-bis[(1-hydrocarbyloxy-2,2,6,6-tetramethylpiperidin-4-Aalkylamino]-s-triazin-6-yl}-3,3'-ethylenediiminodipropylamine, and bridged derivatives as described by formulae $R_1$NH—CH$_2$CH$_2$CH$_2$NR$_2$CH$_2$CH$_2$NR$_3$CH$_2$CH$_2$CH$_2$NHR$_4$ (13)

T-E$_1$-T$_1$ (14)

T-E$_1$ (15)

G-E$_1$-G$_1$-E$_1$-G$_2$ (16),

Where in the tetraamine (13)
$R_1$ and $R_2$ are the s-triazine moiety E; and one of $R_3$ and $R_4$ is the s-triazine moiety E with the other ones of $R_3$ or $R_4$ being hydrogen;
E is

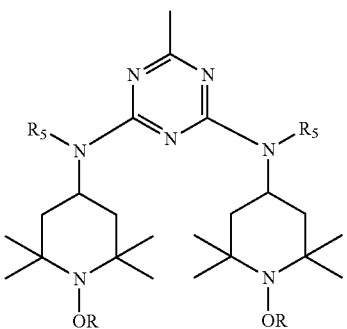

R is methyl, propyl, cyclohexyl or octyl, for instance cyclohexyl;
$R_5$ is $C_1$-$C_{12}$alkyl, for example n-butyl;
where in the compound of formula (14) and (15), when R is propyl, cyclohexyl or octyl,
T and $T_1$ are each a tetraamine substituted by $R_1$-$R_4$ as is defined for formula 13, where
(1) One of the s-triazine moieties E in each tetraamine is replaced by the group $E_1$ which forms a bridge between two tetraamines T and $T_1$;
$E_1$ is a group of the partial formula

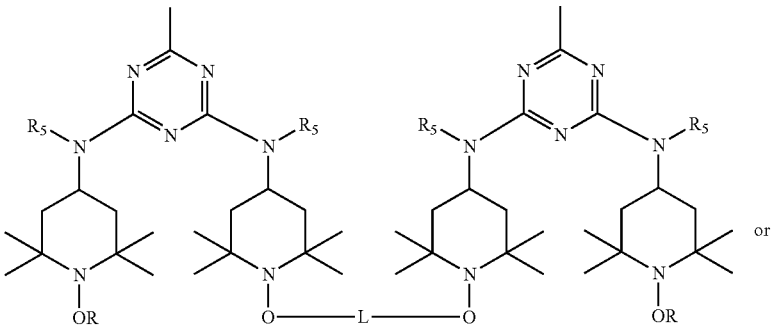

(2) The group $E_1$ can have both termini in the same tetraamine T as in formula 15, where two of the E moieties of the tetraamine are replaced by one $E_1$ group; or
(3) All three s-triazine substituents of tetraamine T can be $E_1$ such that one $E_1$ links T and $T_1$ and a second $E_1$ has both termini in tetraamine T;
L is propanediyl, cyclohexanediyl or octanediyl;
Where in the compound (16)
G, $G_1$ and $G_2$ are each tetraamines substituted by $R_1$-$R_4$ as defined for formula I, except that G and $G_2$ each have one of the s-triazine moieties E replaced by $E_1$, and $G_1$ has two of the triazine moieties E replaced by $E_1$, so that there is a bridge between G and $G_1$ and a second bridge between $G_1$ and $G_2$;
which mixture is prepared by reacting two to four equivalents of 2,4-bis[(1-hydrocarbyloxy-2,2,6,6-tetramethylpiperidin-4-yl)butylamino]-6-chloro-s-triazine with one equivalent of N,N'-bis(3-aminopropyl)ethylenediamine;

Or the hindered amine is a compound of the formula

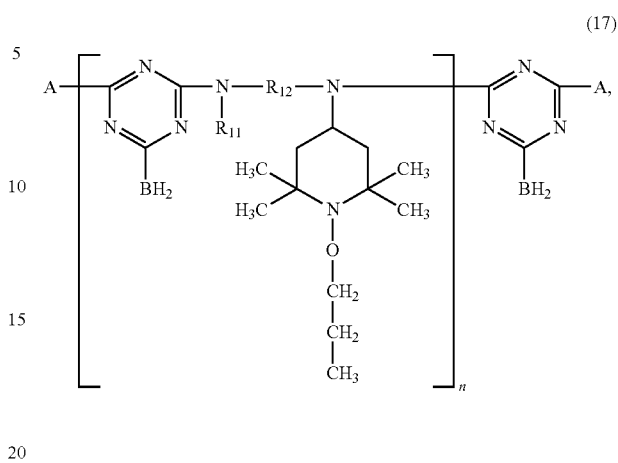

In which the index n ranges from 1 to 15;
$R_{12}$ is $C_2$-$C_{12}$alkylene, $C_4$-$C_{12}$alkenylene, $C_5$-$C_7$cycloalkylene, $C_5$-$C_7$cycloalkylene-di($C_1$-$C_4$alkylene), $C_1$-$C_4$alkylene-di($C_5$-$C_7$cycloalkylene), phenylene-di($C_1$-$C_4$alkylene) or
$C_4$-$C_{12}$alkylene interrupted by 1,4-piperazinediyl, —O— or >N—$X_1$ with $X_1$ being $C_1$-$C_{12}$acyl or
($C_1$-$C_{12}$alkoxy)carbonyl or having one of the definitions of $R_{14}$ given below other than hydrogen; or $R_{12}$ is a group of the partial formulae:

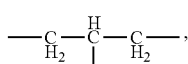

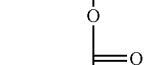

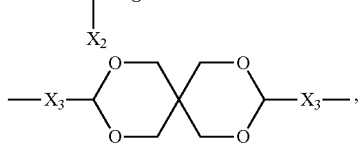

With $X_2$ being $C_1$-$C_{18}$alkyl, $C_5$-$C_{12}$cycloalkyl which is unsubstituted or substituted by 1, 2 or 3 $C_1$-$C_4$alkyl; phenyl which is unsubstituted or substituted by 1, 2 or 3 $C_1$-$C_4$alkyl or $C_1$-$C_4$alkoxy; $C_7$-$C_9$-phenylalkyl which is unsubstituted or substituted on the phenyl by 1, 2 or 3 $C_1$-$C_4$alkyl; and
The radicals $X_3$ being independently of one another $C_2$-$C_{12}$alkylene;

$R_{13}$, $R_{14}$ and $R_{15}$, which are identical or different, are hydrogen, $C_1$-$C_{18}$alkyl, $C_5$-$C_{12}$cycloalkyl which is unsubstituted or substituted by 1, 2 or 3 $C_1$-$C_4$alkyl;

$C_3$-$C_{18}$alkenyl, phenyl which is unsubstituted or substituted by 1, 2 or 3 $C_1$-$C_4$alkyl or $C_1$-$C_4$alkoxy; $C_7$-$C_9$phenylalkyl which is unsubstituted or substituted on the phenyl by 1, 2 or 3 $C_1$-$C_4$alkyl; tetrahydrofurfuryl or $C_2$-$C_4$alkyl which is substituted in the 2, 3 or 4 position by —OH, $C_1$-$C_8$alkoxy, di($C_1$-$C_4$alkyl)amino or a group of the partial formula:

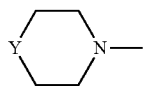

with Y being —O—, —$CH_2$—, —$CH_2CH_2$— or >N—$CH_3$, or —N($R_{14}$)($R_{15}$) is additionally the group

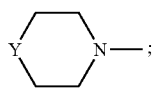

The radicals A are independently of one another —$OR_{13}$, —N($R_{14}$)($R_{15}$) or a group of the partial formula:

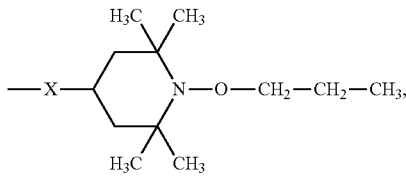

Wherein

X is —O— or >N—$R_{16}$;

$R_{16}$ is hydrogen, $C_1$-$C_{18}$alkyl, $C_3$-$C_{18}$alkenyl, $C_5$-$C_{12}$cycloalkyl which is unsubstituted or substituted by 1, 2 or 3 $C_1$-$C_4$alkyl; $C_7$-$C_9$-phenylalkyl which is unsubstituted or substituted on the phenyl by 1, 2 or 3 $C_1$-$C_4$alkyl; tetrahydrofurfuryl, a group of the partial formula:

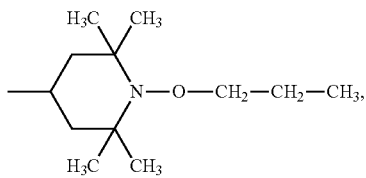

or $C_2$-$C_4$alkyl which is substituted in the 2, 3 or 4 position by —OH, $C_1$-$C_8$alkoxy, di($C_1$-$C_4$alkyl)amino or the group of the partial formula

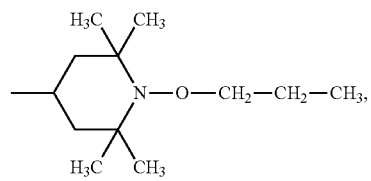

$R_{11}$ has one of the definitions given for $R_{16}$; and the radicals B have independently of one another one of the definitions given for A.

The tetraalkylpiperidine and tetraalkylpiperazine compounds are known in the art, also known as N-alkoxy hindered amines and NOR-hindered amines or NOR-hindered amine light stabilizers or NOR-HALS, such as the ones disclosed in U.S. Pat. Nos. 5,004,770, 5,204,473, 5,096,950, 5,300,544, 5,112,890, 5,124,378, 5,145,893, 5,216,156, 5,844,026, 6,117,995 or 6,271,377.

U.S. Pat. No. 6,271,377, and Published U.S. application Ser. Nos. 09/505,529, filed Feb. 17, 2000, and 09/794,710, filed Feb. 27, 2001 disclose hindered hydroxyalkoxyamine stabilizers. Hindered hydroxyalkoxyamine stabilizers are also known as N-hydroxyalkoxy hindered amines, or NOR-ol-HALS.

Representative structures are the following:

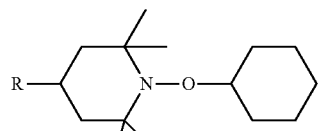

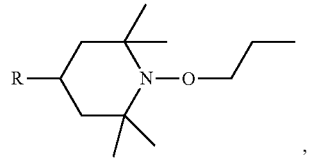

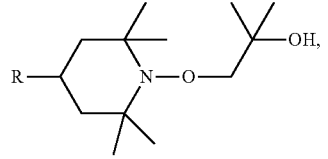

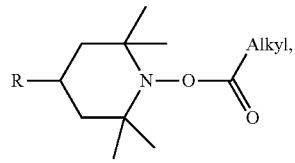

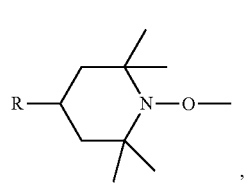

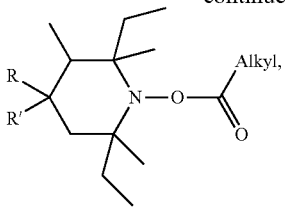

Wherein the definitions of R and R' include N-, O- or C-substituents.

When the group E is —O—C(O)—$C_1$-$C_{18}$alkyl, the compounds are hydroxylamine esters.

The hydroxylamines are reacted with an acid derivative to form the final hydroxylamine ester. Such esterification processes are known and described in the literature.

The preparation of particularly suitable compounds is described in the International Patent Application WO 01/90113.

According to a preferred embodiment, the tetraalkylpiperidine derivative is selected from the group of 2,2,6,6-tetraalkylpiperidine-1-oxides of the formula

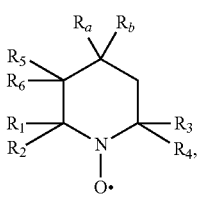

1-hydroxy-2,2,6,6-tetraalkylpiperidines of the formula

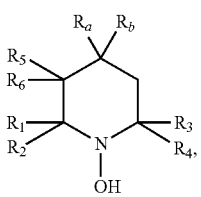

1-alkoxy-2,2,6,6-tetraalkylpiperidines of the formula

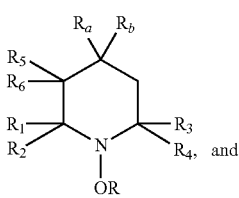

1-acyloxy-2,2,6,6-piperidines of the formula

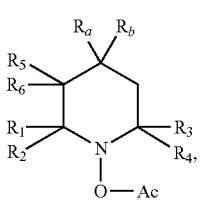

Wherein
One of $R_a$ and $R_b$ represents
Hydrogen or an N-substituent and the other one represents an O-substituent or a C-substituent; or
Both $R_a$ and $R_b$ represent hydrogen, O-substituents or C-substituents;
R represents $C_1$-$C_{20}$alkyl, $C_5$-$C_6$cycloalkyl or $C_2$-$C_{20}$alkyl, $C_5$-$C_6$cycloalkyl or $C_2$-$C_{20}$alkenyl with additional substituents;
Ac represents the acyl group of a $C_1$-$C_{20}$monocarboxylic or $C_1$-$C_{20}$dicarboxylic acid; and
$R_1$-$R_4$ each represent $C_1$-$C_4$alkyl; and
$R_5$ and $R_6$, independently of one another, represent hydrogen or a substituent selected from the group consisting of $C_1$-$C_4$-alkyl, $C_1$-$C_3$alkylphenyl and phenyl; and
$R_5$ and $R_6$ together represent oxo.

According to a preferred embodiment, the composition comprises as Component b) at least one tetraalkylpiperidine derivative II a, II b, II c or II d,
Wherein
One of $R_a$ and $R_b$ represents
Hydrogen or an N-substituent and the other one represents an O-substituent or a C-substituent; or
Both $R_a$ and $R_b$ represent hydrogen, O-substituents or C-substituents;
R represents $C_1$-$C_8$alkyl, $C_5$-$C_6$cycloalkyl or $C_2$-$C_8$alkyl, $C_5$-$C_6$cycloalkyl or $C_2$-$C_8$alkenyl with additional substituents;
Ac represents the acyl group of a $C_1$-$C_8$-carboxylic acid; and
$R_1$-$R_4$ are each methyl; and
$R_5$ and $R_6$ each represent hydrogen.

According to a particularly preferred embodiment, the composition comprises as Component b) at least one tetraalkylpiperidine derivative II a, II b, II c or II d,
Wherein
One of $R_a$ and $R_b$ represents
Hydrogen or an N-substituent and the other one represents an O-substituent or a C-substituent; or
Both $R_a$ and $R_b$ represent O-substituents or C-substituents;
R represents $C_1$-$C_8$alkyl, $C_5$-$C_6$cycloalkyl or $C_2$-$C_8$alkyl, $C_5$-$C_6$cycloalkyl or $C_2$-$C_8$alkenyl substituted by hydroxy;
Ac represents the acyl group of a $C_1$-$C_8$-carboxylic acid; and
$R_1$-$R_4$ are each methyl; and
$R_5$ and $R_6$ each represent hydrogen.

According to a preferred embodiment, Component b) consists of at least one tetraalkylpiperidine derivative II c or II d selected from the group consisting of
1-Cyclohexyloxy-2,2,6,6-tetramethyl-4-octadecylaminopiperidine, bis(1-Octyloxy-2,2,6,6-tetramethylpiperidin-4-yl)sebacate (Tinuvin NOR371®), 2,4-bis[(1-Cyclohexyloxy-2,2,6,6-tetramethylpiperidin-4-yl)butylamino]-6-(2-hydroxyethylamino)-s-triazine,
bis(1-Cyclohexyloxy-2,2,6,6-tetramethylpiperidin-4-yl) adipate, 2,4-bis[(1-Cyclohexyloxy-2,2,6,6-tetramethylpiperidin-4-yl)butylamino]-6-chloro-s-triazine,
1-(2-Hydroxy-2-methylpropoxy)-4-hydroxy-2,2,6,6-tetramethylpiperidine,
1-(2-Hydroxy-2-methylpropoxy)-4-oxo-2,2,6,6-tetramethylpiperidine,
1-(2-Hydroxy-2-methylpropoxy)-4-octadecanoyloxy-2,2,6,6-tetramethylpiperidine,
bis(1-(2-Hydroxy-2-methylpropoxy)-2,2,6,6-tetramethylpiperidin-4-yl) sebacate, bis(1-(2-Hydroxy-2-methylpropoxy)-2,2,6,6-tetramethylpiperidin-4-yl) adipate, 2,4-bis{N-[1-(2-Hydroxy-2-methylpropoxy)-2,2,6,6-tetramethylpiperidin-4-yl]-Nbutylamino}-6-(2-hydroxyethylamino)-s-triazine, The reaction product of 2,4-bis[(1-cyclohexyloxy-2,2,6,6-tetramethylpiperidin-4-yl)butylamino]-6-chloro-s-triazine with N,N'-bis(3-aminopropyl)ethylenediamine),
2,4-bis[(1-Cyclohexyloxy-2,2,6,6-tetramethylpiperidin-4-yl)butylamino]-6-(2-hydroxyethylamino-s-triazine,
The oligomeric compound which is the condensation product of 4,4'-hexamethylenebis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine,
The compound of the formula

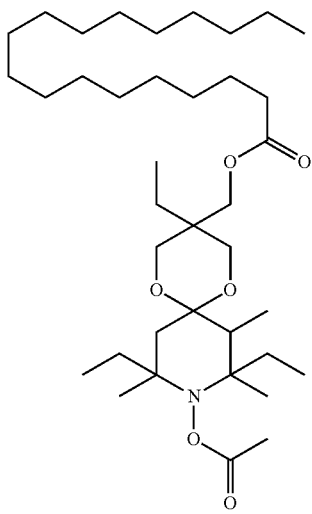

(Irgatec CR 76®)

And the compound of the formula

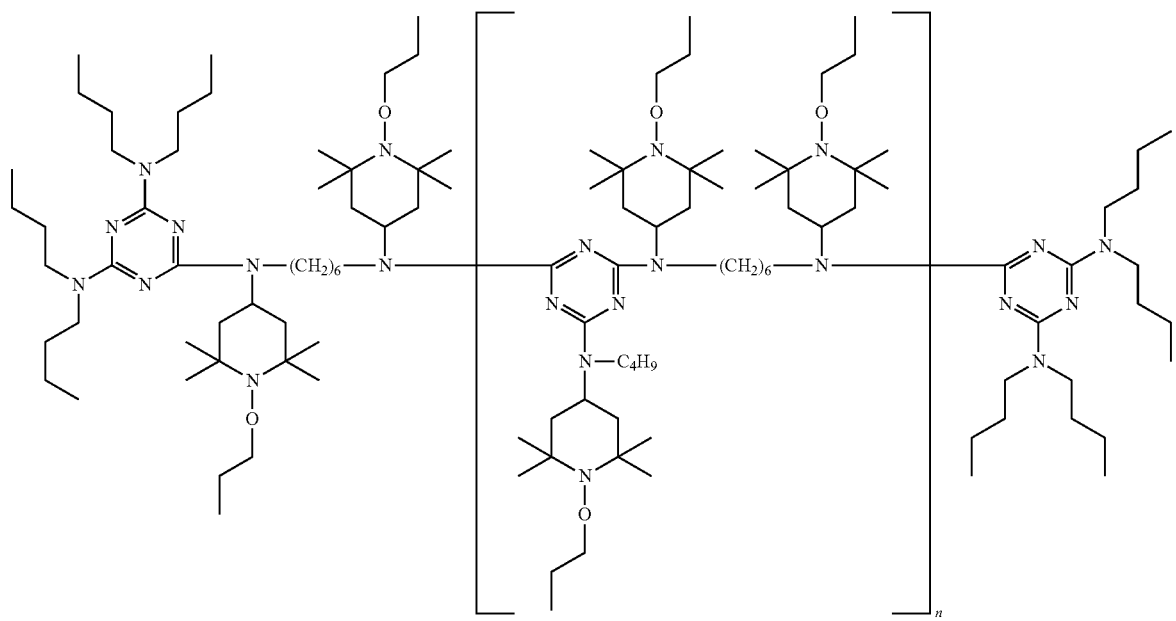

in which n is from 1 to 15 (Flamestab NOR116®).

The above mentioned compounds are partly items of commerce. Representative compounds are marketed by BASF SE under the following trade names Flamestab NOR 116®, Tinuvin NOR371® or Irgatec CR 76®.

The incorporation of the components defined above into the polymer component is carried out by known methods, such as dry blending in the form of a powder, or wet mixing in the form of solutions, dispersions or suspensions for example in an inert solvent, water or oil. The additive components a) and b) and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc.), e.g. as a dry mixture or powder, or as a solution or dispersion or suspension or melt.

The addition of the additive components to the polymer substrate can be carried out in customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contra-rotating and co-rotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion, Vol.* 1 *Grundlagen*, Editors F. Hensen, W. Knappe, H. Potente, 1989, pp. 3-7, ISBN:3-446-14339-4 (*Vol.* 2 *Extrusionsanlagen* 1986, ISBN 3-446-14329-7).

For example, the screw length is 1-60 screw diameters, preferably 35-48 screw diameters. The rotational speed of the screw is preferably 10-600 rotations per minute (rpm), preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The additive component a) and optional further additives can also be sprayed onto the polymer substrate b). The additive mixture dilutes other additives, for example the conventional additives indicated above, or their melts so that they can be sprayed also together with these additives onto the polymer substrate. Addition by spraying during the deactivation of the polymerisation catalysts is particularly advantageous; in this case, the steam evolved may be used for deactivation of the catalyst. In the case of spherically polymerised polyolefins it may, for example, be advantageous to apply the additives of the invention, optionally together with other additives, by spraying.

The additive components a) and optional further additives can also be added to the polymer in the form of a master batch ("concentrate") which contains the components in a concentration of, for example, about 1.0% to about 40.0% and preferably 2.0% to about 20.0% by weight incorporated in a polymer. The polymer is not necessarily of identical structure than the polymer where the additives are added finally. In such operations, the polymer can be used in the form of powder, granules, solutions, and suspensions or in the form of lattices.

Incorporation can take place prior to or during the shaping operation. The materials containing the additives of the invention described herein preferably are used for the production of molded articles, for example roto-molded articles, injection molded articles, profiles and the like, and especially a fibre, spun melt non-woven, film or foam.

The process is carried out in a known manner by analogous methods, such as the ones described in U.S. Pat. No. 5,084,546.

A further embodiment of the invention relates to a mixture, which comprises

A compound of the formula

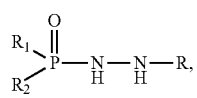

(I)

Wherein

One of $R_1$ and $R_2$ represents hydrogen or a substituent selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono- or bicyclic $C_5$-$C_{20}$cycloalkyl, mono- or bicyclic $C_1$-$C_{12}$alkyl-$C_5$-$C_{20}$cycloalkyl, and mono- or bicyclic $C_5$-$C_{20}$cycloalkyl-$C_1$-$C_4$alkyl; or Both $R_1$ and $R_2$ independently of one another represent substituents selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono- or bicyclic $C_5$-$C_{20}$cycloalkyl, mono- or bicyclic $C_1$-$C_{12}$alkyl-$C_5$-$C_{20}$cycloalkyl, and mono- or bicyclic $C_5$-$C_{20}$cycloalkyl-$C_1$-$C_4$alkyl; or $R_1$ and $R_2$ together represent $C_2$-$C_5$alkylene; and R represents hydrogen or a group of the partial formula

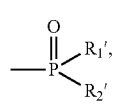

(A)

Wherein $R_1'$ and $R_2'$ are defined as $R_1$ and $R_2$ and salts of these compounds;

In combination with an additional flame retardant, particularly a flame retardant selected from the group consisting of phosphorus containing flame retardants, nitrogen containing flame retardants, halogenated flame retardants and inorganic flame retardants.

The mixture defined above is admixed in concentrations of 0.05-30.0 wt. %, preferably 0.1-20.0 wt. % for component a) and 0.1-60.0 wt. %, preferably 0.5-40 wt. % for component c).

The preferred ratio of components a):c) is in the range 40:1-1:10, preferably 20:1-1:5.

A further embodiment of the invention relates to a process for imparting flame retardancy to a polymer substrate, which process comprises adding to the polymer substrate b) the above defined phosphinic acid hydrazide (I).

The following examples illustrate the invention, but are not meant to limit the scope thereof in any manner:

Materials and Methods

Moplen® HF500 N: Commercial polypropylene (Basell, Germany).

Tinuvin® NOR371: Commercial product (BASF SE, Germany).

Diphenylphosphinic acid hydrazide and bis(diphenylphosphinyl)hydrazide are prepared according to the method of E. Steininger, *Monatshefte für Chemie* 1996, 97(2), 383-390. Chlorodiphenylphosphine oxide was obtained as a commercial product (Aldrich Product No. 230235, Aldrich, Germany).

Test methods to assess flame retardancy:

UL 94 test described in *Flammability of Plastic Materials for Parts in Devices and Appliances*, 5th edition, Oct. 29, 1996. Ratings according to the UL 94-V-test are compiled in the following Table (times are indicated for one specimen):

| Ratings | After-flame time | Burning drips |
| --- | --- | --- |
| V-0 | <10 sec | No |
| V-1 | <30 sec | No |
| V-2 | <30 sec | Yes |
| n.c. | >30 sec | |

Processing and Flame Testing:

Commercial polypropylene (MOPLEN HF500 N) is melt compounded in a Brabender mixing chamber at a temperature of 230° C. under addition of basic-level stabilization (0.3% IRGANOX B225+0.05% Ca-stearate, IRGANOX B225 is a 1:1-mixture of IRGAFOS 168 and IRGANOX 1010) and the additives listed in Table 1.

Test specimen (UL-bars 1.6 mm) are prepared by compression molding in a hot press (Fontjne TP200, pmax=50 kN, 230° C.).

The test samples are investigated for flame retardancy in accordance with UL94-V (Underwriter's Laboratories) test after conditioning for 48 h at 23° C. and 50% relative humidity.

From results it can be concluded that the formulations according to the present invention provide polymers with excellent flame retardant and self-extinguishing properties.

TABLE

UL94 V test results obtained with PP-homopolymer containing different flame retardant aditives

| Example | FR-Additive(s) [wt. %] | Specimen Thickness [mm] | UL94-Rating | Total Burning Time[a] [s] |
|---|---|---|---|---|
| Referential Composition 1 | w/o | 1.34 | n.c. | 232 |
| Referential Composition 2 | +0.75% TINUVIN NOR 371 | 1.37 | n.c. | 213 |
| Inventive Composition 3 | diphenylphosphinic hydrazide structure; 20% | 1.40 | V-2 | 22 |
| Inventive Composition 4 | diphenylphosphinic hydrazide structure; 15% | 1.41 | V-2 | 27 |
| Inventive Composition 5 | diphenylphosphinic hydrazide structure; 15% +0.75% TINUVIN NOR 371 | 1.41 | V-2 | 6 |
| Inventive 6 | diphenylphosphinic-benzoyl hydrazide structure; 15% | 1.40 | V-2 | 76 |
| Inventive 7 | diphenylphosphinic-benzoyl hydrazide structure; 15% +0.75% TINUVIN NOR 371 | 1.40 | V-2 | 17 |

[a] Cumulated burning time out of four UL94-V tests

The invention claimed is:
1. A composition, which comprises
a) a compound of formula (I)

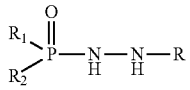

(I)

wherein
one of $R_1$ and $R_2$ represents hydrogen and the other a substituent selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono-or bicyclic $C_5$-$C_{20}$cycloalkyl, mono-or bicyclic $C_1$-$C_{12}$alkyl-$C_5$-$C_{20}$cyclo-alkyl and mono-or bicyclic $C_5$-$C_{20}$cycloalkyl-$C_1$-$C_4$alkyl; or
both $R_1$ and $R_2$ independently of one another represent substituents selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono-or bicyclic $C_5$-$C_{20}$cycloalkyl, mono-or bicyclic $C_1$-$C_{12}$alkyl-$C_5$-$C_{20}$cyclo-alkyl and mono-or bicyclic $C_5$-$C_{20}$cycloalkyl-$C_1$-$C_4$alkyl; or
$R_1$ and $R_2$ together represent $C_2$-$C_5$alkylene; and
R represents hydrogen or a group of partial formula (A)

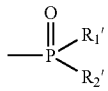

(A)

wherein $R_1'$ and $R_2'$ are defined as $R_1$ and $R_2$;
or a salt of a compound of formula (I); and
b) a polymer substrate.
2. A composition according to claim 1, which comprises
a) a compound of formula (Ia)

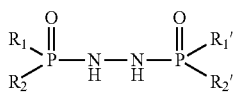

(Ia)

wherein
$R_1$ and $R_2$ independently of one another represent substituents selected from the group consisting of $C_1$-$C_{20}$alkyl, hydroxy-$C_2$$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono-or bicyclic $C_5$-$C_{20}$cycloalkyl, mono-or bicyclic $C_1$-$C_{12}$alkyl-$C_5$-$C_{20}$cycloalkyl and mono-or bicyclic $C_5$-$C_{20}$cycloalkyl-$C_1$-$C_4$alkyl; and
$R_1'$ and $R_2'$ are defined as $R_1$ and $R_2$.
3. A composition according to claim 1, which comprises
a) a compound of formula (Ib)

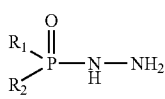

(Ib)

wherein
$R_1$ and $R_2$ independently of one another represent substituents selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono-or bicyclic $C_5$-$C_{20}$cycloalkyl, mono-or bicyclic $C_1$-$C_{12}$alkyl-$C_5$-$C_{20}$cycloalkyl and mono-or bicyclic $C_5$-$C_{20}$cycloalkyl-$C_1$-$C_4$alkyl.
4. A composition according to claim 1, which comprises
a) a compound (I), wherein
both $R_1$ and $R_2$ independently of one another represent substituents selected from the group consisting of $C_1$-$C_{20}$alkyl, $C_6$-$C_{20}$aryl, $C_1$-$C_{12}$alkyl-$C_6$-$C_{20}$aryl and $C_6$-$C_{20}$aryl-$C_1$-$C_4$alkyl; and
R represents hydrogen or a group of the partial formula (A),
wherein $R_1'$ and $R_2'$ are defined as $R_1$ and $R_2$;
or a salt thereof.
5. A composition according to claim 1, which comprises
a) a compound (I), wherein
both $R_1$ and $R_2$ independently of one another represent substituents selected from the group consisting of $C_1$-$C_5$alkyl and phenyl; and
R represents hydrogen or a group of the partial formula (A),
wherein $R_1'$ and $R_2'$ are defined as $R_1$ and $R_2$;
or a salt thereof.
6. A composition according to claim 1, which comprises
a) a compound (I), wherein
both $R_1$ and $R_2$ independently of one another represent substituents selected from the group consisting of $C_1$-$C_8$alkyl and phenyl; and
R represents hydrogen or a group of the partial formula (A), wherein
$R_1'$ and $R_2'$ are defined as $R_1$ and $R_2$;
or a salt thereof; and
b) a thermoplastic polymer substrate.
7. A composition according to claim 1 further comprising an additional flame retardant or an additive selected from the group consisting of polymer stabilizers, tetraalkylpiperidine derivatives and tetraalkylpiperazine derivatives.
8. A composition according to claim 1, further comprising an additional flame retardant selected from the group consisting of melamine polyphosphate, ammonium polyphosphate, melamine ammonium phosphate, melamine ammonium polyphosphate, melamine ammonium pyrophosphate, a condensation product of melamine with phosphoric acid, other reaction products of melamine with phosphoric acid and mixtures thereof.
9. A composition according to claim 1, further comprising tetraalkylpiperidine derivative or a tetraalkylpiperazine derivative selected from the group consisting of 2,2,6,6-tetraalkylpiperidine-1-oxides, 1-hydroxy-2,2,6,6-tetraalkylpiperidines, 1-alkoxy-2,2,6,6-tetraalkylpiperidines, 1-acyloxy-2,2,6,6-tetraalkylpiperidines, 1-hydroxy-2,2,6,6-tetraalkylpiperazines, 1-alkoxy-2,2,6,6-tetraalkylpiperazines and 1-acyloxy-2,2,6,6-tetraalkylpiperazines.
10. A composition according to claim 1, further comprising at least one tetraalkylpiperidine derivative selected from the group consisting of 2,2,6,6-tetraalkylpiperidine-1-oxides of formula (IIa), 1-hydroxy-2,2,6,6-tetraalkylpipendines of formula (IIb), 1-alkoxy-2,2,6,6-tetraalkylpiperidines of formula (IIc) and 1-acyloxy-2,2,6,6-tetraalkylpiperidines of formula (IId),

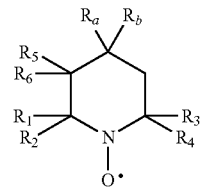

(IIa)

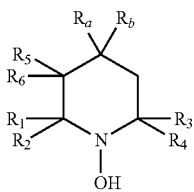

(IIb)

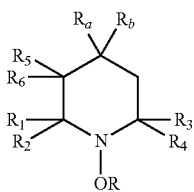

(IIc)

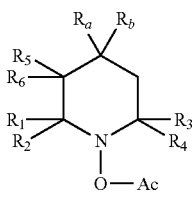

(IId)

wherein
one of $R_a$ and $R_b$ represents
hydrogen or an N-substituent and the other one represents an O-substituent or a C-substituent; or
both $R_a$ and $R_b$ represent hydrogen, O-substituents or C-substituents;
R represents $C_1$-$C_{20}$alkyl or $C_5$-$C_6$cycloalkyl or $C_2$-$C_{20}$alkyl, $C_5$-$C_6$cycloalkyl or $C_2$-$C_{20}$alkenyl with additional substituents;
Ac represents the acyl group of a $C_1$-$C_{20}$carboxylic acid;
$R_1$-$R_4$ each represent $C_1$-$C_4$alkyl; and
$R_5$ and $R_6$, independently of one another, represent hydrogen or a substituent selected from the group consisting of $C_1$-$C_4$-alkyl, $C_1$-$C_3$alkylphenyl and phenyl; or
$R_5$ and $R_6$ together represent oxo.

11. A composition according to claim 10, comprising at least one tetraalkylpiperidine derivative (IIa), (IIb), (IIc) or (IId),
wherein
one of $R_a$ and $R_b$ represents
hydrogen or an N-substituent and the other one represents an O-substituent or a C-substituent; or
both $R_a$ and $R_b$ represent hydrogen, O-substituents or C-substituents;
R represents $C_1$-$C_8$alkyl or $C_5$-$C_6$cycloalkyl or $C_2$-$C_8$alkyl, $C_5$-$C_6$cycloalkyl or $C_2$-$C_8$alkenyl with additional substituents;
Ac represents the acyl group of a $C_1$-$C_8$carboxylic acid;
$R_1$-$R_4$ are each methyl; and
$R_5$ and $R_6$ each represent hydrogen.

12. A composition according to claim 10, comprising at least one tetraalkylpiperidine derivative (IIa), (IIb), (IIc) or (IId),
wherein
one of $R_a$ and $R_b$ represents
hydrogen or an N-substituent and the other one represents an O-substituent or a C-substituent; or
both $R_a$ and $R_b$ represent O-substituents or C-substituents;
R represents $C_1$-$C_8$alkyl or $C_5$-$C_6$cycloalkyl or $C_2$-$C_8$alkyl, $C_5$-$C_6$cycloalkyl or $C_2$-$C_8$alkenyl substituted by hydroxy;
Ac represents the acyl group of a $C_1$-$C_8$carboxylic acid;
$R_1$-$R_4$ are each methyl; and
$R_5$ and $R_6$ each represent hydrogen.

13. A composition according to claim 10, comprising at least one tetraalkylpiperidine derivative (IIc) or (IId) selected from the group consisting of
1-cyclohexyloxy-2,2,6,6-tetramethyl-4-octadecylaminopiperidine,
bis(1-octyloxy-2,2,6,6-tetramethylpiperidin-4-yl) sebacate,
2,4-bis[(1-cyclohexyloxy-2,2,6,6-tetramethylpiperidin-4-yl)butylamino]-6-(2-hydroxyethylamino-s-triazine,
bis(1-cyclohexyloxy-2,2,6,6-tetramethylpiperidin-4-yl) adipate,
2,4-bis[(1-cyclohexyloxy-2,2,6,6-tetramethylpiperidin-4-yl)butylamino]-6-chloro-s-triazine,
1-(2-hydroxy-2-methylpropoxy)-4-hydroxy-2,2,6,6-tetramethylpiperidine,
1-(2-hydroxy-2-methylpropoxy)-4-oxo-2,2,6,6-tetramethylpiperidine,
1-(2-hydroxy-2-methylpropoxy)-4-octadecanoyloxy-2,2,6,6-tetramethylpiperidine,
bis(1-(2-hydroxy-2-methylpropoxy)-2,2,6,6-tetramethylpiperidin-4-yl) sebacate,
bis(1-(2-hydroxy-2-methylpropoxy)-2,2,6,6-tetramethylpiperidin-4-yl) adipate,
2,4-bis{N-[1-(2hydroxy-2-methylpropoxy)-2,2,6,6-tetramethylpiperidin-4-yl]-N-butylamino}-6-(2-hydroxyethylamino)-s-triazine,
the reaction product of 2,4-bis[(1-cyclohexyloxy-2,2,6,6-tetramethylpiperidin-4-yl)butylamino]-6-chloro-s-triazine with N,N'-bis(3-aminopropyl)ethylenediamine),
2,4-bis[(1-cyclohexyloxy-2,2,6,6-tetramethylpiperidin-4-yl)butylamino]-6-(2-hydroxyethylamino)-s-triazine,
the oligomeric compound which is the condensation product of 4,4'-hexamethylenebis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine,
the compound of formula

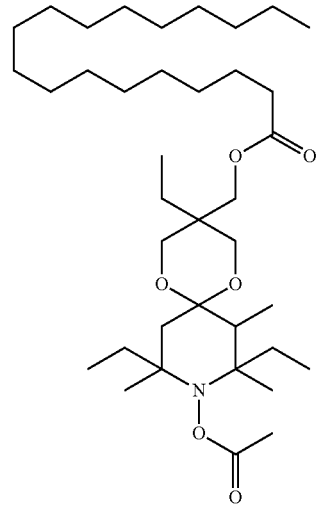 [SMILES: CCCCCCCCCCCCCCCCCC(=O)OCC1(CC)COC2(CC(C)(CC)N(OC(C)=O)C(C)(CC)C2C)OC1]

and the compound of formula

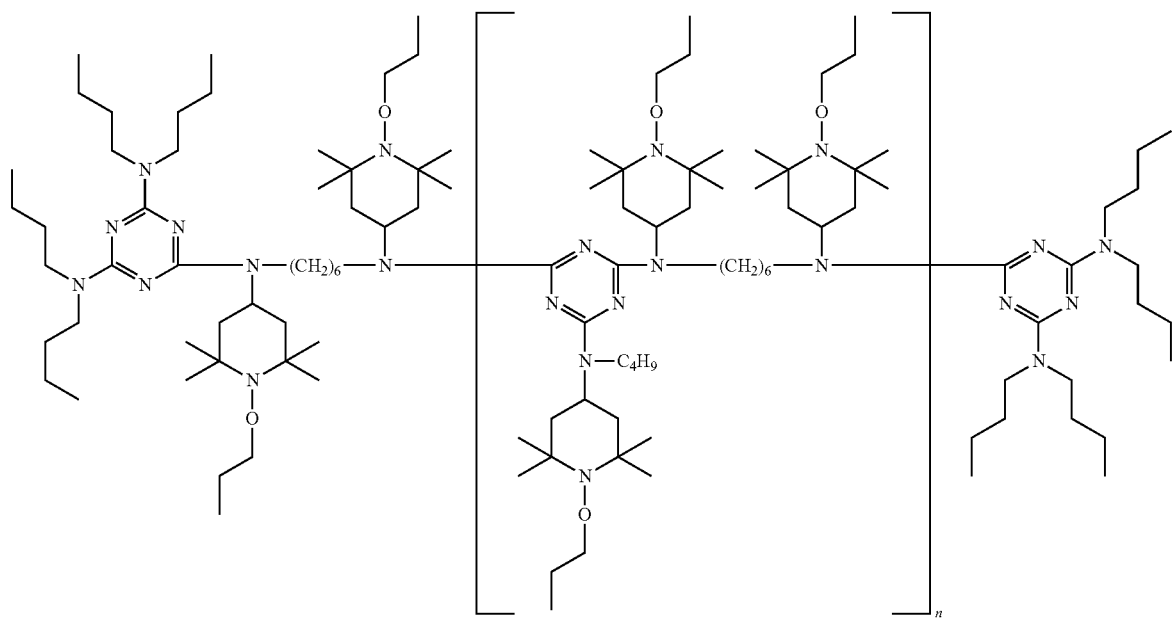

in which n is from 1 to 15.

14. A composition according to claim 1, comprising
b) polypropylene, polyethylene or a copolymer of a monoolefin or diolefin with each other or with another vinyl monomer.

15. A process for imparting flame retardancy to a polymer substrate, which process comprises adding to the polymer substrate a compound of formula (I)

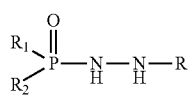
(I)

wherein
one of $R_1$ and $R_2$ represents hydrogen and the other a substituent selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl, $C_6$-$C_{20}$aryl-$C_1$-$C_4$alkyl, mono-or bicyclic $C_5$-$C_{20}$cycloalkyl, mono-or bicyclic $C_1$-$C_{12}$alkyl-$C_5$-$C_{20}$cyclo-alkyl and mono-or bicyclic $C_5$-$C_{20}$cycloalkyl-$C_1$-$C_4$alkyl; or
both $R_1$ and $R_2$ independently of one another represent substituents selected from the group consisting of $C_1$-$C_{20}$alkyl, hydroxy-$C_2$-$C_8$alkyl, $C_2$-$C_{20}$alkenyl, $C_6$-$C_{20}$aryl, $C_1$-$C_{12}$alkyl-$C_6$-$C_{20}$aryl,$C_6$-$C_{20}$aryl-$C_1$-$C_4$alkyl, mono-or bicyclic $C_5$-$C_{20}$cycloalkyl, mono-or bicyclic $C_1$-$C_{12}$alkyl-$C_5$-$C_{20}$cyclo-alkyl and mono-or bicyclic $C_5$-$C_{20}$cycloalkyl-$C_1$-$C_4$alkyl; or
$R_1$ and $R_2$ together represent $C_2$-$C_5$alkylene; and
R represents hydrogen or a group of partial formula (A)

(A)

wherein $R_1'$ and $R_2'$ are defined as $R_1$ and $R_2$.

* * * * *